US012571635B2

(12) United States Patent
Kume et al.

(10) Patent No.: US 12,571,635 B2
(45) Date of Patent: Mar. 10, 2026

(54) AUTONOMOUS DRIVING DEVICE AND VEHICLE CONTROL METHOD

(71) Applicant: DENSO CORPORATION, Kariya City (JP)

(72) Inventors: Takuya Kume, Kariya City (JP); Kazuki Izumi, Kariya City (JP)

(73) Assignee: DENSO CORPORATION, Kariya City (JP)

( * ) Notice: Subject to any disclaimer, the term of this patent is extended or adjusted under 35 U.S.C. 154(b) by 70 days.

(21) Appl. No.: 18/766,169

(22) Filed: Jul. 8, 2024

(65) Prior Publication Data

US 2024/0361132 A1      Oct. 31, 2024

Related U.S. Application Data

(63) Continuation of application No. PCT/JP2023/001006, filed on Jan. 16, 2023.

(30) Foreign Application Priority Data

Jan. 25, 2022      (JP) ................................. 2022-009648

(51) Int. Cl.
        *G01C 21/34*        (2006.01)
        *B60W 40/04*        (2006.01)
                (Continued)
(52) U.S. Cl.
        CPC ......... *G01C 21/3407* (2013.01); *B60W 40/04* (2013.01); *B60W 40/08* (2013.01);
                (Continued)

(58) Field of Classification Search
        CPC ........... G01C 21/3407; G01C 21/3492; B60W 60/001; B60W 40/04; B60W 40/08; B60W 2555/20
        See application file for complete search history.

(56) References Cited

U.S. PATENT DOCUMENTS 6,151,539 A      11/2000  Bergholz et al.
9,500,489 B1 *   11/2016  Ng .................... G01C 21/3461
                (Continued)

FOREIGN PATENT DOCUMENTS

JP         H11212640 A      8/1999
JP         2005324661 A    11/2005
                (Continued)

*Primary Examiner* — Hussein Elchanti
(74) *Attorney, Agent, or Firm* — Harness, Dickey & Pierce, P.L.C.

(57)                ABSTRACT

An autonomous driving operation is performed at an automation level that allows a driver seat passenger to sleep. An approved route approved by the driver seat passenger is acquired. A predetermined delay factor existing on the approved route is detected based on traffic information or weather information. Based on an input signal from a passenger state sensor, it is determined whether the driver seat passenger is asleep. An alternative route that reduces a delay time using map data is searched when detecting the delay factor. A travel plan route is changed to the alternative route without acquiring approval from the driver seat passenger when the alternative route is acquired while the driver seat passenger is asleep.

17 Claims, 9 Drawing Sheets

(51) Int. Cl.
    *B60W 40/08* (2012.01)
    *B60W 60/00* (2020.01)
(52) U.S. Cl.
    CPC ....... *B60W 60/001* (2020.02); *G01C 21/3492*
    (2013.01); *B60W 2555/20* (2020.02)

(56) References Cited

U.S. PATENT DOCUMENTS

| | | | | |
|---|---|---|---|---|
| 2018/0077538 | A1* | 3/2018 | Matus | ..................... H04W 4/40 |
| 2018/0151066 | A1 | 5/2018 | Oba | |
| 2018/0299281 | A1 | 10/2018 | Takashima | |
| 2018/0319279 | A1* | 11/2018 | Ikeda | ................... G06V 20/597 |
| 2019/0039618 | A1 | 2/2019 | Mori | |
| 2019/0061761 | A1 | 2/2019 | Tsuchiya et al. | |
| 2019/0122543 | A1* | 4/2019 | Matus | ................. G08G 1/0133 |
| 2019/0176660 | A1* | 6/2019 | Xiao | ........................ B62D 1/24 |
| 2019/0357834 | A1* | 11/2019 | Aarts | ................... A61B 5/7246 |
| 2020/0290647 | A1* | 9/2020 | Anderson | .......... G01C 21/3691 |
| 2021/0407290 | A1 | 12/2021 | Oba | |
| 2022/0035009 | A1 | 2/2022 | Okada et al. | |
| 2024/0361132 | A1* | 10/2024 | Kume | ..................... G01C 21/34 |
| 2025/0136440 | A1* | 5/2025 | Classen | ................. B81B 7/0041 |
| 2025/0239165 | A1* | 7/2025 | Mann | ........................ G08G 5/34 |

FOREIGN PATENT DOCUMENTS

| | | |
|---|---|---|
| JP | 201741070 A | 2/2017 |
| JP | 201778605 A | 4/2017 |
| JP | 2017107502 A | 6/2017 |
| JP | 2017178131 A | 10/2017 |
| JP | 2018189528 A | 11/2018 |
| JP | 201938356 A | 3/2019 |
| JP | 202051860 A | 4/2020 |
| JP | 20216802 A | 1/2021 |
| WO | WO-2017154396 A1 | 9/2017 |

* cited by examiner

| DELAY FACT TYPE | |
| --- | --- |
| TRA CONG | USUAL TRA CONG (W/O TRA REST) |
| | TRA CONG W/ LANE REST |
| TRA ACCI | |
| STRICTER SPEED LIM (DUE TO RAIN/FOG/WIND) | |

AUTONOMOUS DRIVING DEVICE AND VEHICLE CONTROL METHOD

CROSS REFERENCE TO RELATED APPLICATION

The present application is a continuation application of International Patent Application No. PCT/JP2023/001006 filed on Jan. 16, 2023, which designated the U.S. and claims the benefit of priority from Japanese Patent Application No. 2022-009648 filed on Jan. 25, 2022. The entire disclosures of all of the above applications are incorporated herein by reference.

TECHNICAL FIELD

The present disclosure relates to an autonomous driving device capable of performing autonomous driving in which an passenger sitting on a driver seat as a driver seat passenger (i.e., a driver) is permitted to sleep.

BACKGROUND

A conceivable technique teaches a control device that continues autonomous driving control of a vehicle (i.e., autonomous driving) by an in-vehicle system even while the driver is asleep. Furthermore, another conceivable technique teaches methods for preferentially selecting a travel route to a destination that has as many sections as possible that can be driven autonomously, or a travel route that can continue autonomous driving for a predetermined period of time or more.

SUMMARY

According to an example, an autonomous driving operation is performed at an automation level that allows a driver seat passenger to sleep. An approved route approved by the driver seat passenger is acquired. A predetermined delay factor existing on the approved route is detected based on traffic information or weather information. Based on an input signal from a passenger state sensor, it is determined whether the driver seat passenger is asleep. An alternative route that reduces a delay time using map data is searched when detecting the delay factor. A travel plan route is changed to the alternative route without acquiring approval from the driver seat passenger when the alternative route is acquired while the driver seat passenger is asleep.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
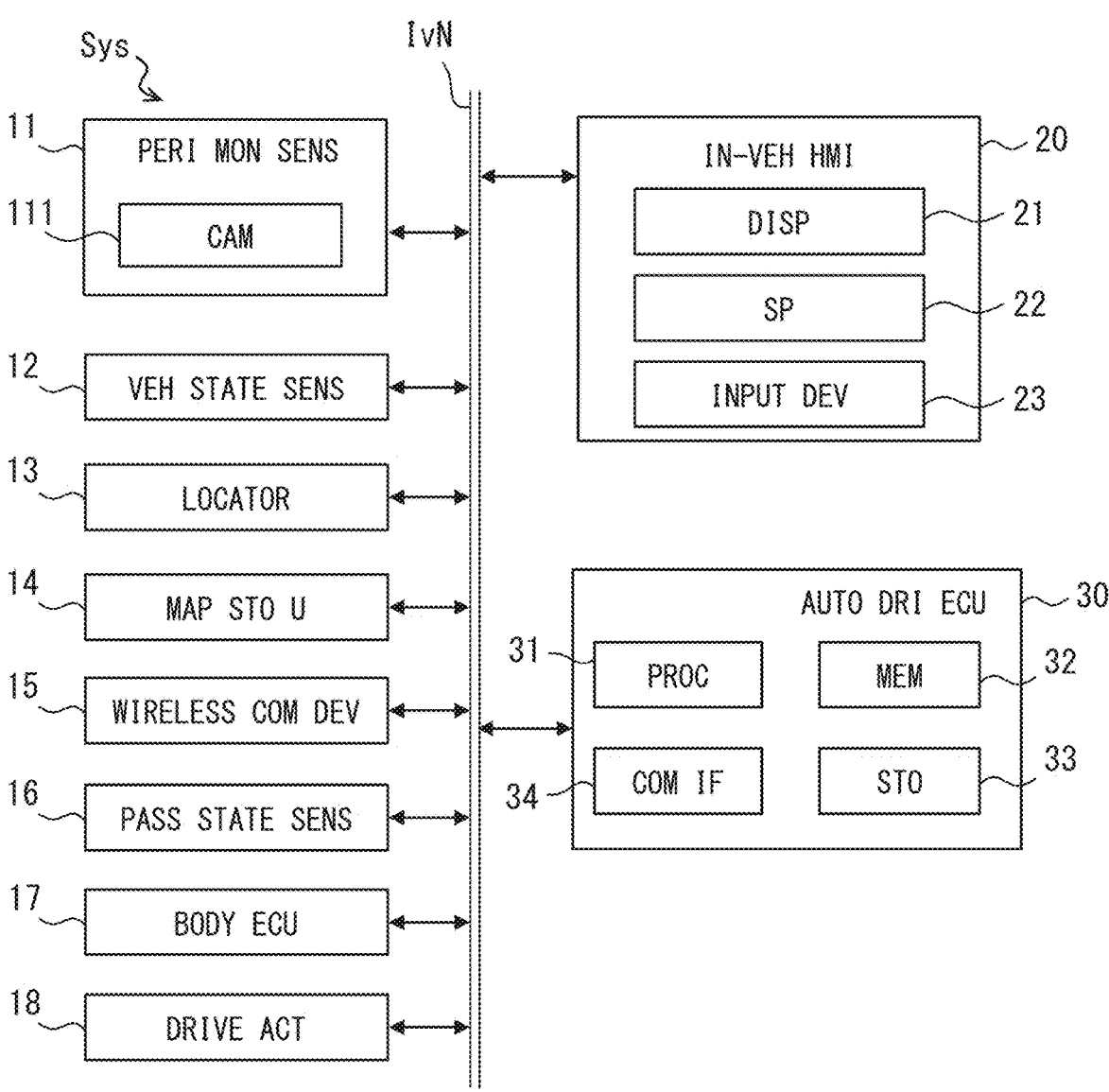
FIG. 1 is a block diagram showing a configuration of an autonomous driving system.

As levels of automation of driving operations, levels 0 to 5 are known, as defined by the Society of Automotive Engineers International (i.e., SAE International, and SAE is a registered trademark). Level 0 is a level in which an passenger in a driver seat (i.e., a driver) performs all driving tasks without intervention from the system. The level 0 corresponds to so-called manual driving. Level 1 is a level in which the system assists either one of the steering operation or the acceleration/deceleration operation. Level 2 is a level in which the system assists both the steering operation and the acceleration/deceleration operation. At the automation levels 1 and 2, the passenger in the driver seat is responsible for monitoring the periphery area to ensure safe driving. The level 3 is a level where the system performs all driving tasks in a certain location, such as a highway, and the passenger in the driver seat performs the driving operation in an emergency. The level 4 is a level where the system is capable of performing all driving tasks, except under a specific circumstance, such as an unsupported road, an extreme environment, and the like. Level 5 is a level where the system performs all driving tasks in all environments.

Automation level 3 and higher corresponds to so-called autonomous driving. At level 3, the passenger in the driver seat is prohibited from shifting into a state where the passenger in the driver seat cannot immediately return to driving operations, such as falling asleep. Levels 4 and 5 correspond to automation levels at which the passenger in the driver seat is permitted to sleep. In this embodiments, the autonomous driving of level 4 or higher is also referred to as level 4 autonomous driving.

In the conceivable technique, the situation is not considered such that a traffic congestion occurs when the Level 4 autonomous driving is being performed and the passenger in the driver seat is asleep. In the Level 4 autonomous driving, generally, the vehicle continues to drive autonomously along the route specified and/or approved by the passenger in the driver seat, even while the passenger in the driver seat is asleep. One possible configuration for an autonomous driving system may simply continue driving along a travel route which has been already set even if a traffic congestion occurs while the passenger in the driver seat is asleep, without attempting to take a detour to avoid the traffic congestion.

In such a case, the passenger in the driver seat may not notice that the scheduled arrival time has been delayed until the passenger in the driver seat wakes up, so that it may reduce the convenience of the autonomous driving function. One possible configuration to address the above concerns may wake up the passenger in the driver seat and then propose a reroute and the like to the passenger in the driver seat when detecting the occurrence of the traffic congestion. However, this configuration may bother the passenger in the driver seat who wishes to sleep.

The present embodiments have been made based on the above considerations or points of view, and one of objects is to provide an autonomous driving device and a vehicle control method that can reduce the risk that the convenience or the comfort of autonomous driving for passengers are reduced due to delay factors such as traffic congestion.

The autonomous driving device described herein is an autonomous driving device that performs an autonomous driving operation at an automation level that allows an passenger in a driver seat, who is an passenger seated in a driver seat, to sleep.

The autonomous driving device includes: a vehicle control unit that performs the autonomous driving operation along an approved route that is a route that has been approved by the passenger in the driver seat; a delay factor detection unit that detects a predetermined delay factor present on the approved route based on traffic information or weather information received from an external device; and an passenger state acquisition unit that determines, based on an input signal from an passenger state sensor for sensing a state of the passenger in the driver seat, whether or not the passenger in the driver seat is asleep. When detecting the delay factor, the vehicle control unit searches for an alternative route that can reduce a delay time using map data. When the alternative route is acquired under a situation that the passenger in the driver seat is asleep, the autonomous driving device is configured to change a travel plan route to the alternative route without acquiring an approval of the passenger in the driver seat.

Further, a vehicle control method according to the present embodiments is a vehicle control method implemented by at least one processor used in a vehicle.

The vehicle control method includes: performing an autonomous driving operation at an automation level that allows an passenger in a driver seat, who is an passenger seated in a driver seat, to sleep based on an instruction from the passenger in the driver seat; acquiring an approved route that is a route that has been approved by the passenger in the driver seat; detecting a predetermined delay factor present on the approved route based on traffic information or weather information received from an external device; and determining, based on an input signal from an passenger state sensor for sensing a state of the passenger in the driver seat, whether or not the passenger in the driver seat is asleep; searching for an alternative route that can reduce a delay time using map data when detecting the delay factor; and changing a travel plan route to the alternative route without acquiring an approval of the passenger in the driver seat when acquiring the alternative route under a situation that the passenger in the driver seat is asleep.

According to the above-described autonomous driving device and the vehicle control method, if the passenger in the driver seat is asleep, it is possible to reduce the delay time without waking up the passenger in the driver seat (i.e., autonomously), thereby improving the convenience and the comfort of autonomous driving function.

Hereinafter, an embodiment of the present embodiments will be described with reference to the drawings. The present embodiments can be modified as appropriate to comply with the laws, regulations, and customs of the region to which the autonomous driving system Sys described below is applied.

INTRODUCTION

FIG. 1 is a diagram showing an example of a schematic configuration of the autonomous driving system Sys according to the present disclosure. The autonomous driving system Sys can be installed not only in passenger cars, but also in vehicles that can travel on roads, such as trucks and trailers. The autonomous driving system Sys may be applied to two-wheeled vehicles, three-wheeled vehicles, and the like in addition to four-wheeled vehicles. The vehicle on which the autonomous driving system Sys is mounted may be an owner car owned by an individual person, a shared car, or a rental car. The shared car is a vehicle provided for a car sharing service. The rental car is a vehicle provided for a vehicle rental service. Hereafter, the vehicle on which the autonomous driving system Sys is mounted is also described as a subject vehicle.

The subject vehicle is an electric vehicle. The concept of an electric vehicle may include not only electric vehicles, but also plug-in hybrid vehicles, hybrid vehicles, and fuel cell vehicles. Here, the subject vehicle may be an engine vehicle. The electric vehicle is a vehicle that has only a motor as a drive source. A hybrid vehicle is a vehicle that has both an engine and a motor. The engine vehicle is a vehicle that has only an engine as the drive source. The engine vehicle corresponds to a vehicle that runs on fuel such as gasoline or light oil.

A driver in the present embodiments may not be limited to the person actually performing driving operations, but may refer to the person who has a responsibility to perform driving operations from the autonomous driving system Sys when the autonomous driving operation ends. In other words, a driver in the present embodiments refers to a person sitting in the driver seat, that is, a passenger in the driver's seat, regardless of whether or not the person is actually driving the vehicle. Thus, the driver described in the present embodiments may be referred to as the driver seat passenger. The subject vehicle may be a remote control vehicle which is remotely controllable by an operator outside the subject vehicle. The person who takes over the driving operations from the autonomous driving system Sys may be an operator outside the vehicle. The operator is a person who has a responsibility to control the vehicle by the remote control operation from the outside of the vehicle. The operator may also be included in a driver or a passenger in the driver seat.

The autonomous driving system Sys provides a so-called autonomous driving function that causes the subject vehicle to autonomously travel along a predetermined route. There are several levels of a degree of automation for driving operations (hereinafter referred to as "automation levels"), as defined by the Society of Automotive Engineers (i.e., SAE International). Automation levels may be divided into six levels, from level 0 to level 5, as follows.

Level 0 is a level where the driver performs all driving tasks without any intervention of the system. The driving tasks may include a steering operation, acceleration/deceleration operation, and the like. The driving tasks may also include monitoring a periphery of the subject vehicle, such as a front area of the subject vehicle. Level 0 corresponds to a fully manual driving level. Level 1 is a level in which the system assists either one of the steering operation or the acceleration/deceleration operation. Level 2 is a level in which the system supports multiple operations among the steering operation and the acceleration/deceleration operation. The level 1 and the level 2 correspond to a driving assist level.

Level 3 is a level in which the system performs all of the driving tasks within an operational design domain (i.e., ODD), while the operation authority is transferred from the system to the driver in an emergency situation. The ODD specifies the conditions under which the autonomous driving can be performed, such as the driving location being on a road only for motor vehicles. The level 3 corresponds to a conditional autonomous driving.

Level 4 is a level in which the system performs all driving tasks, except under a specific situation, such as an unsupported road, an extreme environment, and the like. The Level 4 corresponds to a level in which the system performs all the driving tasks within the ODD. The level 4 corresponds to a highly autonomous driving. Level 5 is a level in which the system is capable of performing all driving tasks in any situation. The level 5 corresponds to a fully autonomous driving.

The automation levels 3 to 5 correspond to the autonomous driving. In the present embodiments, the autonomous driving equivalent to automation level 4 is referred to as level 4 autonomous driving. In addition, the autonomous driving that corresponds to automation level 3 is defined as level 3 autonomous driving. In the level 3 autonomous driving, the driver must quickly take over the driving operations in the event of an emergency so that the driver is prohibited from sleeping, and the like. On the other hand, in the level 4 autonomous driving, the driver may be allowed to sleep. The autonomous driving system Sys described in the present embodiments is configured to be capable of performing the level 4 autonomous driving. Here, the autonomous driving system Sys described in the present embodiments may be configured to be capable of performing the autonomous driving equivalent to the automation level 5.

As an example, the driver seat of the vehicle described below is configured as a reclining seat whose backrest can be reclined to an angle suitable for the passenger to sleep or rest. In the present embodiments, as an example, the angle of the backrest is defined based on the floor of the vehicle as a standard. In the present embodiments, the angle that the backrest of the driver seat makes with respect to the floor or the seat surface of the vehicle is also referred to as the backrest angle. The smaller the backrest angle, the further the backrest is reclined toward the rear side of the vehicle. A suitable backrest angle for a passenger to sleep or rest is, for example, 30 degrees. Here, the driver seat may be configured so that the backrest can be reclined up to 0 degrees. In the present embodiments, a state in which the backrest angle is 45 degrees or less is also referred to as a rest position. As another aspect, the backrest angle may be defined based on the vehicle height direction.

(Overview Configuration of Autonomous Driving System Sys)

The autonomous driving system 1 has various configurations shown in FIG. 1 as an example. That is, the autonomous driving system Sys includes a periphery monitor sensor 11, a vehicle state sensor 12, a locator 13, a map storage unit 14, a wireless communication device 15, a passenger state sensor 16, a body ECU 17, and a drive actuator 18. The autonomous driving system Sys also includes an in-vehicle HMI 20 and an autonomous driving ECU 30. The ECU is an abbreviation of Electronic Control Unit and indicates an electronic control unit. HMI is an abbreviation for Human Machine Interface.

The autonomous driving ECU 30 is connected to each of the above-described devices and sensors, such as the periphery monitor sensor 11, so as to be able to communicate with each other via the in-vehicle network IvN or by a dedicated signal line. The in-vehicle network IvN is a communication network constructed in the vehicle Hv. As the standard for the in-vehicle network IvN, various standards such as Ethernet (registered trademark) can be adopted. Some of the devices and the sensors may be directly connected to the autonomous driving ECU 30 via dedicated signal lines. The connection form between the devices can be changed as appropriate.

The periphery monitor sensor 11 is an autonomous sensor that monitors a periphery environment of the subject vehicle. The periphery monitor sensor 11 can detect a moving object and a stationary object specified in advance from a detection range at the periphery of the subject vehicle. The autonomous driving system Sys may be equipped with multiple types of periphery monitor sensors 11. The autonomous driving system Sys is equipped with a camera 111 as a periphery monitor sensor 11.

The camera 111 is a so-called front camera that is disposed so as to capture an image of the area ahead of the vehicle at a predetermined angle of view. For example, the front camera 111 is disposed on an upper end portion of a windshield in the vehicle compartment, a front grille, a roof top, or the like. The camera 111 detects a predetermined detection target by performing recognition processing on the image frame. The camera 111 detects and identifies objects registered as detection targets using an identifier that applies a deep learning method. Here, as a deep learning method, CNN (i.e., Convolutional Neural Network) or DNN (i.e., Deep Neural Network) can be adopted.

The camera 111 detects moving objects such as pedestrians and other vehicles. The camera 111 also detects features such as road edges, road markings, and structures disposed along the roadside. The road markings include lane markings that indicate lane boundaries, crosswalks, stop lines, guide strips, safety zones, and traffic regulation arrows. The structure disposed along the roadside may include traffic signs, guard rails, curbs, electric poles, or traffic lights. The camera 111 can also detect the lighting state of lighting devices such as hazard lights and turn signals of the vehicle ahead.

The autonomous driving system Sys may be equipped with multiple cameras 111. The autonomous driving system Sys may be equipped with, as the camera 111, in addition to a front camera, a side camera that captures images of the sides of the vehicle and a rear camera that captures images of the rear side of the vehicle. The function of detecting a detection target object by analyzing camera images may be provided by the autonomous driving ECU 30 or the like. Also, the arrangement of functions in the autonomous driving system Sys can be changed as appropriate. The camera 111 outputs at least one of the image signal and the analysis result of the image signal as detection information to the in-vehicle network IvN. The detection results of each periphery monitor sensor 11 are input to the autonomous driving ECU 30 via the in-vehicle network IvN.

The autonomous driving system Sys may be equipped with a millimeter wave radar, a LiDAR, a sonar, and the like in addition to a camera 111 as a periphery monitor sensor 11. The millimeter-wave radar is a device that detects the relative position and the relative speed of an object with respect to the subject vehicle by transmitting and receiving probe waves such as millimeter waves or quasi-millimeter waves. The LiDAR is an abbreviation for Light Detection and Ranging or Laser Imaging Detection and Ranging. The LiDAR is a device that generates three-dimensional point cloud data indicating a position of a reflection point in each detection direction by emitting laser light. The LiDAR is also defined as laser radar. The sonar is a device that detects the relative position and the relative speed of reflection objects by transmitting and receiving ultrasonic waves as probe waves. The autonomous driving system Sys may also be equipped with multiple units of each of the millimeter wave radars, the LiDARs, and the sonars.

The vehicle state sensor 12 is a sensor group that detects information related to a state of the subject vehicle. The vehicle state sensor 12 includes a vehicle speed sensor, a steering angle sensor, an acceleration sensor, and a yaw rate sensor. The vehicle speed sensor detects a traveling speed of the subject vehicle. The steering angle sensor detects a steering angle of the subject vehicle. The acceleration sensor detects acceleration such as front-rear acceleration and right-left acceleration of the subject vehicle. The yaw rate sensor detects an angular velocity of the subject vehicle. The vehicle state sensor 12 outputs data, indicating a current value (i.e., a detection result) of a physical quantity as a detection target, to the in-vehicle network IvN.

A type of a sensor used by the autonomous driving system Sys as the vehicle state sensor 12 may be appropriately designed, and it is not necessary to include various types of sensors as described above. Alternatively, the autonomous driving system Sys may be equipped with a backrest angle sensor or the like as the vehicle state sensor 12. The backrest angle sensor is a sensor that detects the backrest angle of the driver seat. The autonomous driving ECU 30 may receive a signal indicating the backrest angle of the driver seat from a backrest angle sensor or a seat motor provided in the driver seat.

The locator 13 is a device that calculates and outputs the position coordinates of the subject vehicle using navigation signals transmitted from positioning satellites that constitute the Global Navigation Satellite System (i.e., GNSS). The locator 13 includes a GNSS receiver, an inertial sensor, and the like. The locator 13 combines the positioning signal received by the GNSS receiver, the measurement results of the inertial sensor, the vehicle speed information flowing through the in-vehicle network IvN and the like, to sequentially calculate the subject vehicle position, the travel direction and the like, and outputs the data to the autonomous driving ECU 30.

The map storage unit 14 is a storage device that stores so-called HD (i.e., High Definition) map data, which includes road information necessary for the autonomous driving control. The map data stored in the map storage unit 14 includes the three-dimensional shape of roads, the positions of road markings such as lane markings, the positions of traffic signs, and the like with the accuracy required for the autonomous driving and the like.

The map data stored in the map storage unit 14 can be updated by data received by the wireless communication device 15 from a map server or the like. The map server is a server located outside the vehicle that distributes map data. The map storage unit 14 may be a storage device for temporarily storing the map data received by the wireless communication device 15 from the map server until the validity period of the data expires. The map storage unit 14 may be built into the autonomous driving ECU 30 or the locator 13. The map data stored in the map storage unit 14 may be navigation map data, which is map data for navigation, on the condition that the map data includes data on features such as merge points, traffic lights, and landmarks.

The wireless communication device 15 is a device for performing the wireless communication between the subject vehicle and other devices. The wireless communication device 15 is configured to be capable of performing cellular communication. The cellular communication is wireless communication that complies with standards such as LTE (i.e., Long Term Evolution), 4G, and 5G. The subject vehicle may be a connected car that can connect to the Internet by being equipped with the wireless communication device 15. The autonomous driving ECU 30, in cooperation with the wireless communication device 15, can download the map data corresponding to the current location from a map distribution server and use the map data. Here, the wireless communication device 15 may be configured to perform the wireless communication directly with another device without a wireless base station in accordance with a wide-area wireless communication standard. That is, the wireless communication device 15 may be configured to perform cellular V2X (e.g., PC5/Uu) communication.

Moreover, the wireless communication device 15 is configured to be able to perform short range communication. In present embodiments, the short-range communication refers to wireless communication in which the communication distance is limited to within several hundred meters. As a standard for the short range communication, it is possible to adopt DSRC (i.e., Dedicated Short Range Communications) corresponding to the IEEE802.11p standard, Wi-Fi (registered trademark), or the like. The short range communication may be implemented by the above-described cellular V2X. The wireless communication device 15 may be configured to be capable of performing only one of the cellular communication and the short range communication.

The wireless communication device 15 acquires traffic information, such as traffic congestion information, accident information, and traffic restriction information, from external devices, such as a map server, a traffic information center, a roadside device, and other vehicles. The traffic congestion information includes at least one of the location of the traffic congestion section and the traffic congestion length. The traffic congestion length is a parameter that indicates the distance of the traffic congestion. The traffic congestion length is expressed in terms of distance, for example, 1 km. The traffic congestion length may be expressed as a required passage time, which is the time required from entering the traffic congestion section to exiting (i.e., leaving) the traffic congestion section. The traffic congestion length may be indirectly expressed by the start and end positions of the traffic congestion section. The traffic congestion information may include the cause of the traffic congestion, the average speed in the traffic congestion section, and the like.

In this case, a traffic congestion can be defined as a state in which the travel speed is below a predetermined traffic congestion determination value, or a state in which a line of vehicles repeatedly stopping and starting continues for 1 km or more and 15 minutes or more. The traffic congestion determination value is, for example, 40 km/h. Alternatively, the traffic congestion determination value may be 20 km/h or 60 km/h. The traffic congestion determination value may be variably determined according to the maximum speed (i.e., speed limit) set for each road. The traffic congestion determination value may be set to, for example, one-fourth of the maximum speed. The traffic congestion determination value may be different depending on whether the road is a road only for motor vehicles or an ordinary road. The traffic congestion determination value for a road only for motor vehicles may be 20 km/h, whereas the traffic congestion determination value for an ordinary road may be 10 km/h. The road only for motor vehicles here refers to a road on which the pedestrian or the bicycle is prohibited from entering, such as a toll road or an expressway.

The accident information includes location information of the location where the traffic accident occurred. The traffic restriction information includes the location of a section where lane restrictions are in place due to construction or an accident, and the lane number where the traffic is restricted. Furthermore, the traffic restriction information may include location information of a section where the maximum speed is restricted due to weather reason such as strong winds or road conditions. The traffic restriction information may be information indicating the current maximum speed for each road section. A part or all of the accident information and the traffic restriction information may be distributed in an integrated manner with the traffic congestion information.

The wireless communication device 15 also acquires weather information from an external device. The weather information includes precipitation, wind speed, temperature, and the like for each location within a most recent certain period of time. The weather information may be data showing the movement of rain clouds within a most recent certain period of time. The various information acquired by the wireless communication device 15 is transferred to the autonomous driving ECU 30.

The passenger state sensor 16 is a sensor that detects the state of a passenger, including at least the driver. The autonomous driving system Sys may be equipped with multiple types of passenger state sensors 16. The autonomous driving system Sys is equipped with an passenger monitor camera as a passenger state sensor 16. The passenger monitor camera is disposed in the vehicle compartment at a position and an orientation that allows the passenger monitor camera to capture an image of at least the face of the driver. The passenger monitor camera is positioned on the top surface of the steering column cover, the top surface of the instrument panel, the top edge of the windshield, and the like with an orientation of its optical axis facing the headrest of the driver seat so that the passenger monitor camera can capture the driver's face.

The passenger monitor camera successively detects the driver's state based on the facial image of the driver included in the captured image. The passenger monitor camera sequentially detects the driver's state, such as the direction of the driver's face, the direction of the driver's line of sight, and the degree to which the driver's eyelids are open (i.e., so-called eye opening degree). The passenger monitor camera serving as the passenger state sensor 16 sequentially outputs information indicating the driver's state specified from the captured image to the in-vehicle network IvN as driver state data.

The passenger monitor camera may be a visible light camera or an infrared camera. The passenger monitor camera may be provided in an overhead console or in the center of the ceiling so as to be able to capture an image of the face of the driver who is sleeping on his/her back. The passenger monitor camera may be disposed at any position where the passenger monitor camera can capture an image of the face of a person sitting in the passenger seat or the back seat. The passenger monitor camera may be configured to detect the presence or absence of a passenger in the front passenger seat and the state of the passenger in the front passenger seat, in addition to the state of the driver. A passenger monitor camera may be provided for each seat. The function of detecting the state of the driver, and the like based on the image signal from the camera may be provided outside the camera, in the autonomous driving ECU 30 or the like.

The autonomous driving system Sys may be equipped with a biosensor other than the passenger monitor camera as the passenger state sensor 16 instead of or in addition to the passenger monitor camera. The autonomous driving system Sys may be equipped with a passenger state sensor 16 such as a heart rate sensor, a pulse wave sensor, a body temperature sensor, and the like. The heart rate sensor or the like may be built into the backrest or the headrest of the driver seat, or may be provided on the steering wheel. The passenger state sensor 16 may be a wearable device that is attached to the driver's wrist or the like when used. The wearable devices may have a variety of shapes, such as wristband types, watch types, finger ring types, and earphone types. The wearable device as the passenger state sensor 16 is configured to be able to communicate with the autonomous driving ECU 30 via the wireless communication device 15. The connection between the wearable device and the autonomous driving ECU 30 may be wireless or wired.

The body ECU 17 is an ECU that integrally controls body-related in-vehicle devices mounted on the vehicle. The body-related in-vehicle devices includes seat motors and the like. The seat motor is a motor that changes the front-rear position, the height, and the backrest angle of the driver seat. The body ECU 17 may output a signal indicating the current backrest angle to the autonomous driving ECU 30 based on an input signal from the seat motor.

The in-vehicle HMI 20 is a group of interfaces for exchanging information between the passengers and the autonomous driving system Sys. The in-vehicle HMI 20 includes a display 21 and a speaker 22 as notification devices for notifying the driver of information. The in-vehicle HMI 20 also includes an input device 23 as an input interface that accepts operations from the passenger.

The autonomous driving system Sys includes, as the display 21, one or more of a head-up display (i.e., HUD), a meter display, and a center display. The HUD is a device that projects image light onto a predetermined area of the windshield to display a virtual image that can be perceived by the driver. The meter display is a display disposed in an area of the instrument panel in front of the driver seat. The center display is, for example, a display provided in the central region of the instrument panel in the vehicle width direction. The meter display and the center display can be realized using a liquid crystal display or an organic EL display. Based on the control signal and the image signal input from the autonomous driving ECU 30, the display 21 displays an image corresponding to the input signals.

The speaker 22 is a device that outputs a sound corresponding to a signal input from the autonomous driving ECU 30. The sound includes voice, music, and the like in addition to a notification sound. In addition, the autonomous driving system Sys may be equipped with a vibrator, an ambient light, or the like as a notification device. The vibrator is a device for applying vibration stimuli to the driver, and is provided on the backrest of the driver seat or on the seat belt. The vibrator may be a device that applies a vibration stimulus to the driver by vibrating the seat belt itself. The ambient light is lighting devices that use a plurality of light emitting diodes (i.e., LEDs) and that are capable of adjusting the emission color and the emission intensity of light, and are provided on an instrument panel, a steering wheel, and the like.

The input device 23 is a device for receiving an instruction operation from the driver to the autonomous driving system Sys. The input device 23 may be a steering switch provided on a spoke portion of a steering wheel, an operation lever provided on a steering column portion, a touch screen laminated on the center display, or the like. The autonomous driving system Sys may be equipped with multiple types of devices as the input device 23. The input device 23 outputs an electric signal corresponding to the driver's operation as an operation signal to the in-vehicle network IvN. The operation signal indicates the operation contents of the driver, in other words, the contents of an instruction. The autonomous driving system Sys accepts instructions regarding the start and the end of the level 4 autonomous driving via the input device 23. The system may be configured so that instructions to start and end the autonomous driving can be input by voice input. The input device 23 may also include a device for voice input such as a microphone. Here, an HCU (i.e., HMI Control Unit) may be arranged between the in-vehicle HMI 20 and the autonomous driving ECU 30. The HCU is a device that comprehensively controls the notification of information to the driver.

The autonomous driving ECU 30 is an ECU that performs some or all of the driving operations on behalf of the driver by controlling the drive actuator 18 based on the detection results of the periphery monitor sensor 11 and the like. The autonomous driving ECU 30 is also defined as an automatic operation device. For example, the drive actuator 18 includes a brake actuator as a braking device, an electronic throttle, a steering actuator, and the like. The steering actuator includes an EPS (i.e., Electric Power Steering) motor. Another ECU such as a steering ECU for steering control, a power unit control ECU for acceleration/deceleration control, or the like may be arranged between the autonomous driving ECU 30 and the drive actuator.

The autonomous driving ECU 30 mainly includes a computer, which includes a processor 31, a RAM 32, a storage 33, a communication interface 34, and a bus connecting these components. The memory 32 is a rewritable volatile storage medium, and is a RAM (i.e., Random Access Memory). The storage 33 is a rewritable non-volatile memory such as a flash memory. The storage 33 stores a vehicle control program, which is a program to be executed by the processor 31. The execution of the vehicle control program by the processor 31 corresponds to the execution of a vehicle control method. A processor that executes processing related to driving assistance may be provided separately from a processor that executes processing related to the autonomous driving. The autonomous driving ECU 30 may have multiple processors 31.

The autonomous driving ECU 30 has multiple operation modes with different automation levels. Here, as an example, the autonomous driving ECU 30 has a full manual driving mode, a driving assistance mode, and the autonomous driving mode and is configured to be switchable between these operation modes. Each operation mode differs in the range of driving tasks that the driver is responsible for, in other words, the range of driving tasks in which the system intervenes. The system here indicates the autonomous driving system Sys, that is, substantially the autonomous driving ECU 30. The operation mode can also be referred to as the driving mode.

The full manual driving mode is a mode of operation in which the driver performs all driving tasks. The full manual driving mode corresponds to the automation level 0. The driving assistance mode is an operation mode in which the system executes at least one of the acceleration/deceleration operation and the steering operation. In the driving assistance mode, the driver is the one who performs the steering operation, and the mode requires that the driver at least monitors the periphery, such as the area ahead of the vehicle. The full manual driving mode and the driver assistance mode are driving modes in which the driver performs at least some of the driving tasks. Therefore, in the present embodiments, when there is no need to distinguish between the full manual driving mode and the driving assistance mode, the full manual driving mode and the driving assistance mode are also referred to as the passenger involvement mode. The passenger involvement mode can also be referred to as a manual driving mode as an antonym of the autonomous driving mode.

The autonomous driving mode is a driving mode in which the system performs all driving tasks. Here, as an example, the autonomous driving mode is an operation mode that performs the control of the vehicle equivalent to the automation level 4. The autonomous driving mode may be an operation mode that performs the autonomous driving of the automation level 5. The autonomous driving mode corresponds to an operating mode in which the driver is permitted to sleep. The autonomous driving mode can be called a sleep-permission mode. The manual driving mode can be switched to the autonomous driving mode based on an operation signal input from the input device 23. Here, the autonomous driving ECU 30 may be provided with a level 3 mode that performs the level 3 autonomous driving as an intermediate operation mode between the autonomous driving mode and the driving assistance mode. The Level 3 mode can also be referred to a sleep prohibition mode.

In the autonomous driving mode, the autonomous driving ECU 30 automatically performs the steering operation, the acceleration operation, and the deceleration operation (in other words, the braking operation) of the subject vehicle such that the subject vehicle travels along the road to a destination set by the driver. The autonomous driving mode is terminated due to the driver's operation, the system restrictions, exiting the ODD, and the like. The autonomous driving ECU 30 may be a device that performs the autonomous driving up to a preset location of the operation authority transfer that is set along the travel plan route on the way to the destination. The preset location of the operation authority transfer corresponds to the schedule point of exit of the ODD.

Examples of the ODD include that: (a) the road is a highway or a road only for motor vehicles with a median divider and a guardrail; (b) the amount of rainfall is below a predetermined threshold; and (c) all or a predetermined number or more of the periphery monitor sensors 11 are operating normally. The travel road indicates a road on which the subject vehicle is traveling. Other features such as no parked vehicles on the road may be included in the ODD. A condition for determining whether the autonomous driving is allowable or not allowable, in other words, a detailed condition for defining the ODD can be designed as appropriate.

(Configuration of Autonomous Driving ECU)

Figures 2, 3:
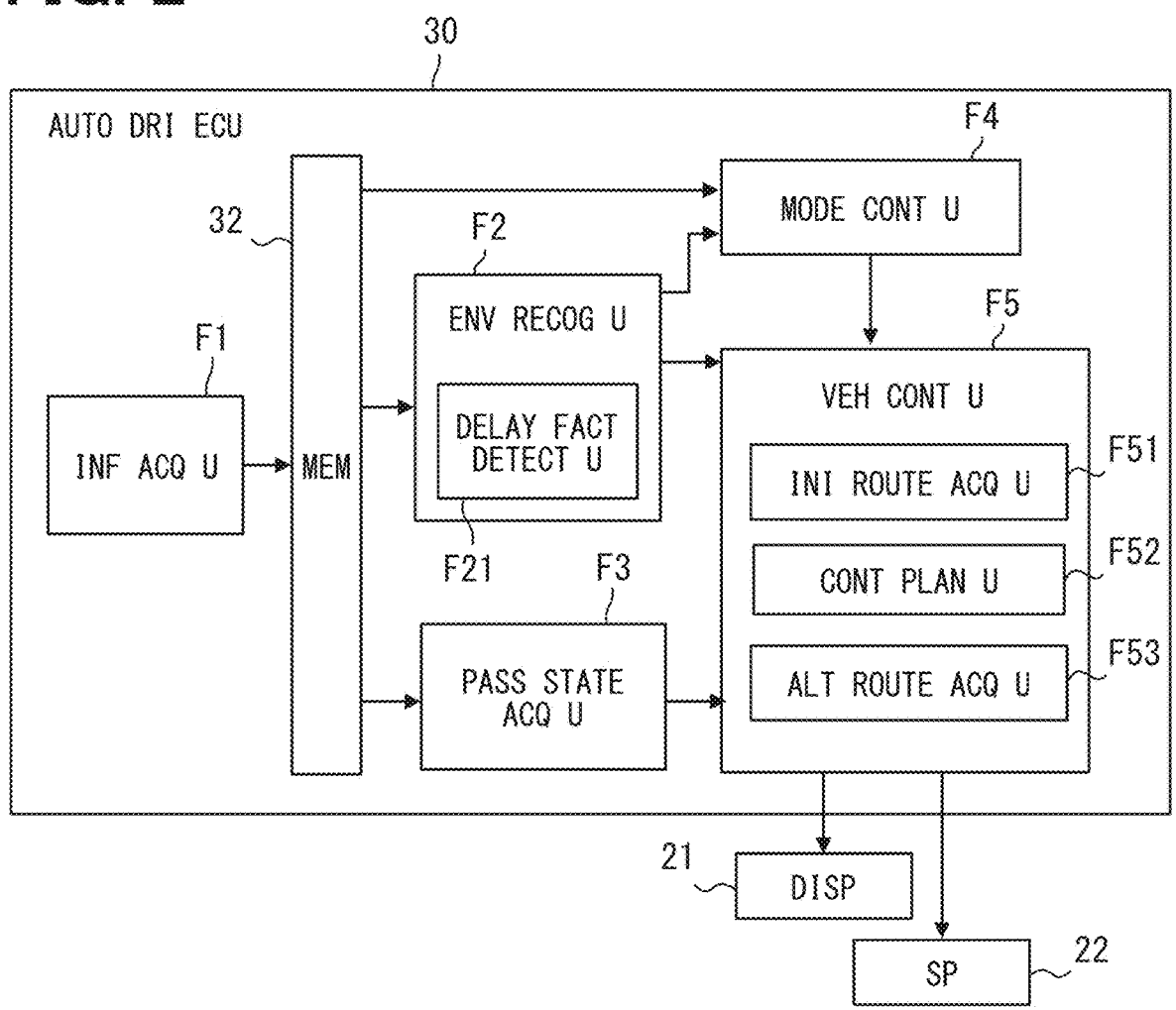
FIG. 2 is a functional block diagram showing an autonomous driving ECU.
FIG. 3 is a diagram showing an example of a delay factor.

As shown in FIG. 2, the autonomous driving ECU 30 has, as functional units, an information acquisition unit F1, an environment recognition unit F2, a passenger state acquisition unit F3, a mode control unit F4, and a vehicle control unit F5. Each functional unit is realized by the processor 31 executing the autonomous driving program. Here, some of the functions of the autonomous driving ECU 30 may be realized using an IC or the like.

The information acquisition unit F1 is configured to acquire various information for performing vehicle control such as the autonomous driving operation and the driving assistance operation. The "acquisition" in the present embodiments includes generation and detection by internal calculation based on data or the like received from another device and/or another sensor. This is because the functional arrangement in the system is appropriately changed.

The information acquisition unit F1 acquires detection results (that is, sensing information) from various periphery monitor sensors 11 including a camera 111. The sensing information includes a position, a moving speed, and a type of the detected object existing around the subject vehicle such as another moving object, a structure or an obstacle. The information acquisition unit F1 acquires the traveling speed, the acceleration, the yaw rate, and the external illuminance of the subject vehicle from the vehicle state sensor 12. Furthermore, the information acquisition unit F1 acquires vehicle position information and periphery map information relating to road structure from the locator 13.

The information acquisition unit F1 cooperates with the wireless communication device 15 to acquire traffic information and weather information about a road section through which the subject vehicle is scheduled to pass within a predetermined time. The information acquisition unit F1 may cooperate with the wireless communication device 15 to acquire vehicle information transmitted from a forward vehicle through vehicle-to-vehicle communication. The vehicle information may include the state of hazard lights, the state of turn signals, the state of brakes, driving speed, location information, and the like.

The information acquisition unit F1 also acquires the driver's operations regarding the autonomous driving system Sys based on signals from the input device 23. The information acquisition unit F1 acquires operation signals related to the start and the end of the autonomous driving from the input device 23.

The information acquisition unit F1 acquires information for determining the driver's state (that is, determination materials) from the passenger state sensor 16. The information that can be used to determine the driver's state includes a pulse rate, a heart rate, a respiratory rate, body movement, an eye opening degree, a blinking frequency, a degree of variation in blinking intervals, a posture, body temperature, and time since falling asleep. The pulse rate, the heart rate, the respiratory rate, and the like can be expressed as the number of times per a given time, such as one minute.

Various pieces of information sequentially acquired by the information acquisition unit F1 are stored in a temporary storage medium such as the memory 32, and are used by the environment recognition unit F2, the passenger state acquisition unit F3, and the like. The various information can be classified by types and stored in the memory. For example, the various information can be sorted and stored with the latest data first. The data in which a certain time elapses after acquisition can be discarded from the memory.

The environment recognition unit F2 recognizes the travel environment of the subject vehicle based on the subject vehicle position information, the periphery object information, the traffic information, the weather information, the map data, and the like acquired by the information acquisition unit F1. The environment recognition unit F2 recognizes the travel environment of the subject vehicle by performing the sensor fusion process for integrating the detection results of multiple periphery monitoring sensors 11, such as the camera 111 and the millimeter wave radar 112, with a predetermined weight.

The travel environment includes the position and the type of each object present around the vehicle. The environment recognition unit F2 also acquires the moving speed and the moving direction of each moving object as the travel environment. The environment recognition unit F2 also acquires information such as the curvature of the road, the number of lanes, the vehicle's lane number, the weather, the road surface condition, and whether or not the road is in a congestion section. The subject vehicle lane number indicates in which lane the subject vehicle is traveling from or relative to the left road edge or the right road edge. The locator 13 may specify the subject vehicle lane number. The weather condition and the road condition can be specified by combining the recognition results of the camera 111 with the whether information. The road structure may be specified using the map data in addition to the recognition result of the camera 111. The environment recognition unit F2 acquires the outside vehicle environment information related to the ODD, such as the road structure, the weather, and the road surface condition.

The environment recognition unit F2 also includes a delay factor detection unit F21 as a component for detecting a delay factor that exists on the travel route of the subject vehicle. A delay factor refers to an event that causes a delay a predetermined value or more from the scheduled arrival time. As shown in FIG. 3, the delay factor includes a traffic congestion, an accident, and a tightened speed limit. The traffic congestion can be classified into an usual traffic congestion that is not accompanied by a traffic restriction such as a lane restriction and/or a road closure, a lane restriction traffic congestion resulting from the lane restriction, and a road closure traffic congestion resulting from the road closure. The lane restriction indicates that some of the lanes on a road are closed. The lane restriction may also be implemented for construction work, when an accident occurs, or when an event such as a marathon race requires the use of part of a road. A road closure indicates that all lanes of a road are closed. The road closure may occur due to an accident, as well as a weather condition such as flooding, snow accumulation, and snow removal work. The tightening of the speed limit refers to the maximum speed set on a road being lower than the usual speed limit due to weather or other reasons. In the present embodiments, a section where the speed limit is tightened is also referred to as a tightened speed limit section.

The delay factor detection unit F21 recognizes the factor of the delay and its type based on information received from a traffic information center or the like. The delay factor detection unit F21 may detect a factor of delay such as traffic congestion by recognizing the contents displayed on an electronic traffic message board. The factor of delay may be expressed in terms of events (i.e., true causes) that cause the traffic congestion and/or the speed slowdown such as accidents, construction, heavy traffic, and weather (e.g., heavy rain, snowstorm), without using the concept of the traffic congestion.

Here, when a traffic congestion exists on the travel route, the vehicle may already be caught in the traffic congestion. The environment recognition unit F2 may use vehicle speed information, the frequency of stopping and starting, and the detection results of the periphery monitoring sensor 11 to determine whether or not the vehicle is caught in a traffic congestion. Specifically, when the speed of the subject vehicle remains below a traffic congestion determination value for a predetermined period of time (for example, five minutes) or more, the environment recognition unit F2 determines that the periphery area is in a traffic congestion state. The delay factor detection unit F21 may detect the traffic congestion section, a fallen object, a lane restriction, and the like, based on vehicle information acquired from multiple preceding vehicles through vehicle-to-vehicle communication.

The passenger state acquisition unit F3 determines the state of the driver based on the information acquired by the information acquisition unit F1. The passenger state acquisition unit F3 determines whether the driver is asleep or not by using a combination of the driver's pulse, an eye opening, body temperature distribution, posture, and the like. Furthermore, when the passenger state acquisition unit F3 determines that the driver is asleep, the passenger state acquisition unit F3 measures the sleep continuation time period, which is the elapsed time from when the driver fell asleep. The sleep continuation time period is measured from the point in time when it is determined that the driver has fallen asleep, that is, when it is determined that the driver has transitioned from a wakeful state to a sleep state. The feature that the driver has fallen asleep can be determined based on the driver's biological information, such as whether the driver's eyes are closed for a predetermined period of time or more. The sleep continuation time period may be measured from the time when the driver inputs to the system that the driver is about to go to sleep. The sleep continuation time period may be measured from the time when the driver sets the driver's seat to a resting position as the sleep start time. The passenger state acquisition unit F3 can also acquire information on the presence or absence of a fellow passenger and whether the fellow passenger is asleep or not.

The mode control unit F4 controls the operation mode of the autonomous driving ECU 30 based on various information acquired by the information acquisition unit F1. When the mode control unit F4 is in the passenger involvement mode and the travel environment satisfies the ODD, and an instruction signal to start the autonomous driving is input from the input device 23, the mode control unit F4 determines to shift to the autonomous driving mode. Then, a signal requesting a shift to the autonomous driving mode is output to the control plan unit F52. Here, during the autonomous driving mode, if the travel environment recognized by the environment recognition unit F2 no longer satisfies the ODD, or if it is estimated that the travel environment will no longer satisfy the ODD within a predetermined time, the mode control unit F4 determines to shift to the passenger involvement mode and notifies the control plan unit F52 of this determination.

Furthermore, when an operation signal for terminating the autonomous driving mode or an override operation by the driver is detected from the input device 23 during the autonomous driving mode, the mode control unit F4 determines to terminate the autonomous driving mode. Then, the mode control unit F4 outputs a signal for switching to the manual driving mode to the control plan unit F52 and the vehicle control unit F5. The override operation refers to the operation of the passenger on the operation element such as the steering wheel and/or the pedals. The operation mode to which the vehicle shifts when the autonomous driving mode ends may be a fully manual driving mode or a driving assistance mode. The shift destination when the autonomous driving mode ends may be dynamically determined depending on the situation, or may be registered in advance by the driver.

The vehicle control unit F5 plans the control content to be executed as the driving assistance operation or the autonomous driving operation, and controls the travel actuator 18, the display 21, and the like in accordance with the plan. The vehicle control unit F5 has, as sub-function units, an initial route acquisition unit F51, a control plan unit F52, and an alternative route acquisition unit F53.

The initial route acquisition unit F51 is configured to acquire a travel route to a destination set by the driver based on map data as an initial route. The initial route here refers to the route that is set when the destination is registered. The initial route may include an autonomous driving section, in which the vehicle is travelling in the autonomous driving mode, and a manual driving section, in which the vehicle is travelling in the manual driving mode. The initial route corresponds to a route in which the area to be traveled by the autonomous driving and the like have been approved by the driver.

The process for acquiring an initial route may include acquiring a destination, calculating candidate routes to the destination, and acquiring driver instructions (or agreement) to set one of the candidate routes as the travel route. The destination in the present embodiments is not limited to a final destination, but may be a stopover point or the like. The driver instructions regarding the destination and route determination are acquired based on operation signals inputted from the input device 23. The calculation of the route to the destination may be performed by the autonomous driving ECU 30 itself or by an external server. As a route search method, various methods can be used, such as the methods disclosed in JP-2018-189528-A, JP-2017-78605-A, and JP-2020-51860-A. The entire disclosures of all of JP-2018-189528-A, JP-2017-78605-A, and JP-2020-51860-A are incorporated herein by reference. The initial route acquisition unit F51 can also calculate an estimated arrival time, which is the estimated time of arrival at the destination, based on the average travel speed for each road section indicated by the traffic information.

In the autonomous driving mode, the control plan unit F52 generates a travel plan for autonomous driving based on the results of the travel environment recognition by the environment recognition unit F2. A travel plan may also be defined as a control plan. The control plan includes a travel position, target speed, and steering angle for each time. The travel plan may include acceleration/deceleration schedule information for a speed adjustment along a calculated route and schedule information for steering control. The control plan unit F52 may set a target speed for each location using an average travel speed for each road section indicated by the traffic information.

The control plan unit F52 can update the estimation arrival time, which is the estimated time of arrival at the destination, at any time. If a delay factor is detected, the estimation arrival time is calculated taking into account the effect of the delay factor. The vehicle control unit F5 displays the calculated estimation arrival time on the display 21 as needed.

In the present embodiments, the estimation arrival time calculated and displayed before the driver falls asleep is also referred to as the estimation arrival time before sleep. The estimation arrival time before sleep is a scheduled time that has been notified to the driver, in other words, a scheduled time that has been accepted by the driver. In addition, in the present embodiments, the estimation arrival time calculated after the delay factor is detected, taking into account the influence of the delay factor, is also referred to as the estimation delay time. The estimation delay time may also be updated at predetermined intervals, for example, every 5 or 15 minutes. The control plan unit F52 sequentially calculates an arrival delay time, which is the range of variation (i.e., the degree of delay) of the estimation arrival time due to a delay factor, based on the estimation arrival time before sleep. The arrival delay time corresponds to the difference between the estimation arrival time before sleep and the latest estimation delay time. In addition, if the driver is awake at the time the delay factor is detected, the arrival delay time may be calculated based on the estimation arrival time calculated and/or displayed before the delay factor is detected. As another aspect, the arrival delay time may be calculated based on the initial estimation arrival time, which is the estimation arrival time displayed when the initial route was calculated.

The control plan unit F52 generates a plan related to notification processing to the passenger using a notification device such as the display 21, in addition to the control plan directly related to the travelling of the vehicle. The control plan unit F52 determines the timing of notifying an upcoming action, such as a lane change or deceleration, and the timing of notifying (or detecting and reporting) the delay factor, depending on the situation. In other words, the control plan unit F52 also generates a control plan for the notification device related to the notification of the delay factor.

The vehicle control unit F5 generates control commands based on the control plan generated by the control plan unit F52, and sequentially outputs the control commands to the traveling actuators 18, the display 21, and the like. In addition, the vehicle control unit F5 also controls the lighting state of turn signals, headlights, hazard lights, and the like in accordance with the travel plan and the external environment, based on the plan of the control plan unit F52 and the external environment.

The alternative route acquisition unit F53 is configured to use the map data to search for an alternative route that can reduce the arrival delay time when the delay factor detection unit F21 detects a delay factor such as traffic congestion during the autonomous driving. The alternative route acquisition unit F53 executes an alternative route search process in accordance with the procedure illustrated in FIG. 4. The alternative route search process is a series of processes for acquiring an alternative route. The flowchart shown in FIG. 4 can be executed when a delay factor that causes an arrival delay time to be equal to or greater than a predetermined reroute attempt threshold is detected. The reroute attempt threshold may be 30 minutes or 1 hour. The reroute attempt threshold may be a system design value, or may be a value specified by the driver via a predetermined setting change screen.

Figure 4:
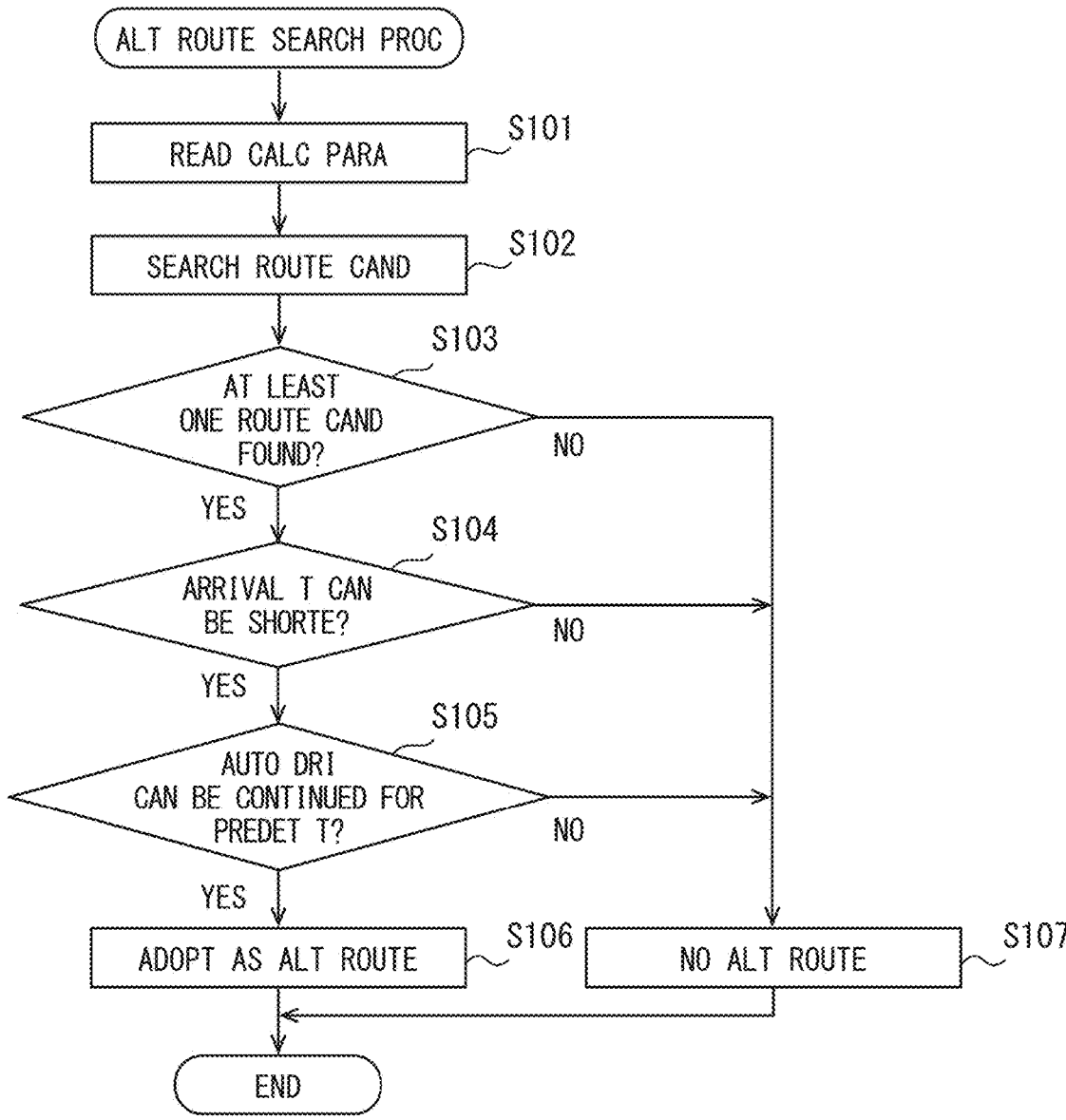
FIG. 4 is a flowchart showing an example of an alternative route search process.

As shown in FIG. 4, the alternative route search process may include steps S101 to S107. Step S101 is a step for reading out various calculation parameters used in route search, such as the current position of the vehicle, the destination, and position information of the delay section. In the present embodiments, a delay section refers to a section in which a delay factor exists.

Step S102 is a step of searching for alternative route candidates using the parameters read out in step S101 and the map data. As alternative route candidates, multiple routes can be calculated based on different perspectives, such as prioritizing the distance, prioritizing the arrival time, and prioritizing the autonomous driving operation. Depending on the configuration of the road network relating to the current position and the destination, multiple alternative route candidates may be calculated as a result of step S102. Also, as a result of step S102, it is possible that no alternative route candidates are found. The alternative route candidates calculated in step S102 may be routes that can reach the destination from the current position. Here, the route candidates calculated in step S102 may be routes that satisfy conditions such as arrival time and continuity of autonomous driving, which are considered in step S103 and thereafter.

In step S103, it is determined whether or not at least one alternative route candidate has been found. When at least one alternative route candidate is found, the alternative route acquisition unit F53 executes step S104. On the other hand, if no alternative route candidate is found ("NO" at step S103), it is concluded that there is no alternative route (at step S107). The case where there is no alternative route indicates that there is no branch road within a predetermined distance from the current position, or that the nearest branch point is located after passing through a delay section.

Step S104 is a step of determining whether or not there is a route that can reduce the arrival delay time among the alternative route candidates found in step S102. If there is no route that can reduce the arrival delay time ("NO" at step S104), it is concluded that there is no alternative route (at step S107). If the estimation arrival time of any candidate is later than the estimation delay time, it may be determined that there is no alternative route.

Furthermore, when the amount of shortening of the arrival time by the alternative route candidate is less than a predetermined shortening threshold even if there is an alternative route candidate that can shorten the estimation arrival time, the alternative route candidate is not adopted (i.e., discarded). In the present embodiments, the length of time by which the arrival delay time can be suppressed (i.e., shortened) is also referred to as the delay time reduction amount. The delay time reduction amount of the alternative route candidate corresponds to the difference between the estimation delay time and the estimation arrival time on the alternative route candidate. The shortening threshold is set to 15 minutes, 30 minutes, 45 minutes, or the like. The shortening threshold may be set large enough that the driver is likely to perceive the re-route as being worthwhile. The shortening threshold may also be a designed fixed value or a value set by the driver. The shortening threshold may be 0 minutes.

Step S104 corresponds to a step of searching for an alternative route candidate whose delay time reduction amount is equal to or greater than a predetermined value. If there is at least one alternative route candidate for which the delay time reduction amount is equal to or greater than the shortening threshold as a result of the determination process in step S104, the alternative route acquisition unit F53 executes step S105 for that alternative route candidate as a target.

Step S105 is a step for determining whether or not there is a route among the alternative route candidates remaining as a result of the selection process in step S104, whose AD continuable time that is the time during which the autonomous driving mode can be continued is equal to or longer than a predetermined or dynamically-determined AD continuation required time. The AD continuable time of the alternative route candidate is the remaining time until the subject vehicle reaches the ODD exit point on the alternative route candidate. The AD continuable time is determined based on the remaining distance to the ODD exit point on the alternative route candidate and the estimation travel speed to the ODD exit point.

In addition, in the present embodiments, "AD" indicates the autonomous driving, and is an abbreviation for, for example, autonomous driving/automated driving. In the present embodiments, the term "AD" indicating the autonomous driving can be changed and interpreted as other expressions indicating the autonomous driving, such as SD (i.e., self-driving) or AO (i.e., automatic operation).

The AD continuation required time used in the determination in step S105 is a parameter that indicates the time for which the driver requires to continue the autonomous driving. When the driver is asleep, the processor 31 sets the value acquired by subtracting the sleep continuation time from the minimum sleep time as the AD continuation required time. The minimum sleep time is a parameter that indicates the amount of sleep the driver requires. The minimum sleep time is set at 30, 60, or 90 minutes. The minimum sleep time can be set to any value by the driver via a setting screen. In a configuration in which the minimum sleep time is set to 60 minutes, if the sleep continuation time is 50 minutes, the AD continuation required time used in step S105 is set to 10 minutes. Therefore, in step S105, the alternative route acquisition unit F53 searches for alternative route candidates that allow the autonomous driving to be continued for 10 minutes or more. When the driver is awake, the processor 31 sets the AD continuation required time to a predetermined value, such as 0 minutes or 5 minutes. If the driver is awake, the processor 31 may set the AD continuation required time to a value acquired by subtracting the elapsed time since the autonomous driving starts from a minimum continuation time that is preset as described below.

In another aspect, the alternative route acquisition unit F53 may use the value acquired by subtracting the elapsed time since the autonomous driving starts from the minimum continuation time set by the driver or a designer as the AD continuation required time, regardless of whether the driver is asleep or not. The minimum continuation time is a parameter that corresponds to the minimum value of the time that the autonomous driving should continue once the autonomous driving has started, unless a specific emergency situation occurs. An emergency situation here refers to a contact with another vehicle, a forceful cut-in of another vehicle, an approaching emergency vehicle, heavy rainfall that exceeds acceptable limits, and the like. The emergency situation include events that may be outside the ODD. In a configuration in which the minimum continuation time is set to 30 minutes, if 15 minutes have elapsed since the start of the autonomous driving, the AD continuation required time used in step S105 may be 30 minutes. Alternatively, the AD continuation required time may be a fixed value, such as 30 minutes or 1 hour, regardless of the driver's state or the time elapsed since the start of the autonomous driving.

When the delay time reduction amount is equal to or greater than the shortening threshold and there is no route on which the autonomous driving can be continued for equal to or longer than the AD continuation required time ("NO" at step S105), the alternative route acquisition unit F53 determines that there is no alternative route (at step S107). On the other hand, there is a route that can reduce the arrival delay time by equal to or more than the shortening threshold and that can continue the autonomous driving for equal to or more than the AD continuation required time ("YES" at step S105 YES), the alternative route acquisition unit F53 adopts the route candidate as an alternative route (at step S106). Here, when there are multiple alternative routes that satisfy the above adoption conditions, the alternative route acquisition unit F53 adopts as the alternative route the route with the largest amount of the delay time reduction amount or the route with the longest AD continuable time. The driver and/or the designer can select which parameter to give priority to, the delay time reduction amount or the AD continuable time.

Figure 5:
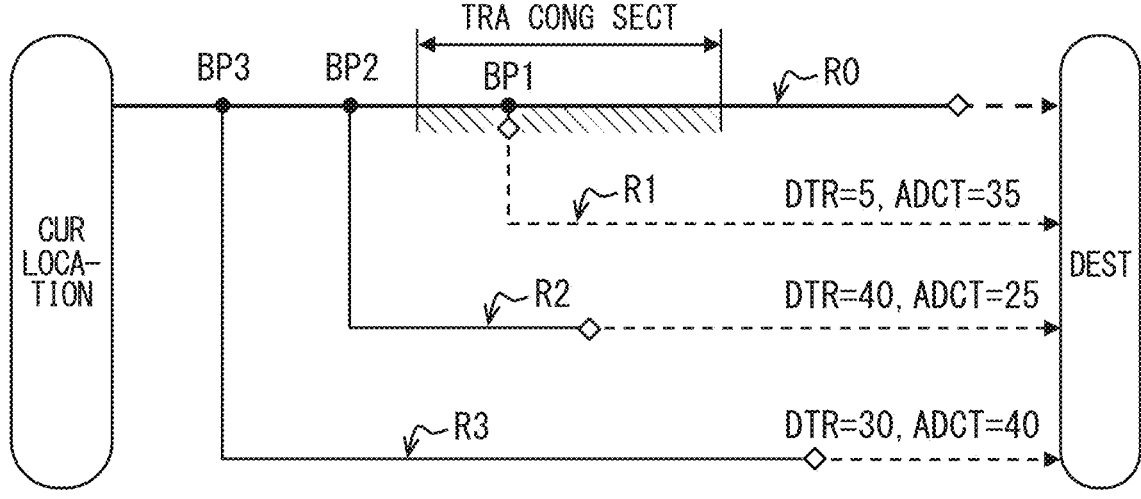
FIG. 5 is a diagram for explaining the operation of a processor when selecting an alternative route from alternative route candidates.

FIG. 5 is a diagram conceptually illustrating the above-described method of selecting an alternative route. A solid line in FIG. 5 indicates a section where the vehicle can be driven in the autonomous driving mode (i.e., the autonomous driving section), and a dashed line indicates a section where the vehicle must be driven in the passenger involvement mode (i.e., the manual driving section). In the drawing, the route indicated by R0 is the initial route, and the route indicated by R1 is the first alternative route candidate. R2 indicates the second alternative route candidate, and R3 indicates the third alternative route candidate. A circular mark (i.e., a dot) placed on the route in FIG. 5 indicates a branching point. Here, a diamond mark indicates the exit point of the ODD, that is, the point where the autonomous driving ends. The ODD exit point corresponds to an exit from a road only for motor vehicles onto an ordinary road (i.e., an interchange), or a point where the number of lanes on a road is reduced from two or more to one.

The first alternative route candidate R1 is a route that travels along a road different from the initial route R0 after a branch point BP1 that is located in the middle of the congested section. The branch point BP1 is an exit from the expressway to an ordinary road. The first alternative route candidate R1 is a route that is driven in the manual driving mode after the branch point BP1. The first alternative route candidate R1 is a route candidate with a delay time reduction amount of 5 minutes and an AD continuable time of 35 minutes. In FIG. 5, DTR indicates a delay time reduction amount, and ADCT indicates an AD continuable time. The feature of "DTR=5" indicates that the delay time reduction amount is 5 minutes.

The second alternative route candidate R2 is a route that travels along a road different from the initial route R0 at a branch point BP2 that is located before the branch point BP1. The branch point BP2 is a junction that leads to another highway. In the second alternative route candidate R2, the autonomous driving mode is maintained to a certain extent even after the branch point BP2. The second alternative route candidate R2 is a route candidate with a delay time reduction amount of 40 minutes and an AD continuable time of 25 minutes.

The third alternative route candidate R3 is a route candidate that adopts a route different from the initial route R0 at a branch point BP3 that is different from both branch points BP1 and BP2. The branch point BP3 is also a junction that leads to another highway. In the third alternative route candidate R3, the autonomous driving mode is maintained to a certain extent even after the branch point BP3. The third alternative route candidate R3 is a route candidate with a delay time reduction amount of 30 minutes and an AD continuable time of 40 minutes.

When the route candidates shown in FIG. 5 are acquired, if the shortening threshold is set to 30 minutes and the AD continuation required time is set to 30 minutes, the alternative route acquisition unit F53 adopts the third alternative route candidate R3 as the alternative route. On the other hand, when the shortening threshold is set to 30 minutes and the AD continuation required time is set to 20 minutes, the second alternative route candidate R2 having a larger delay time reduction amount (i.e., DTR) may be adopted as the alternative route.

Although the above describes an example in which traffic congestion is a delay factor, the delay factor is not limited to this feature. The alternative route acquisition unit F53 can similarly search for an alternative route even when a section where the speed limit has been tightened is detected.

<Delay Factor Response Process During Autonomous Driving>

Figure 6:
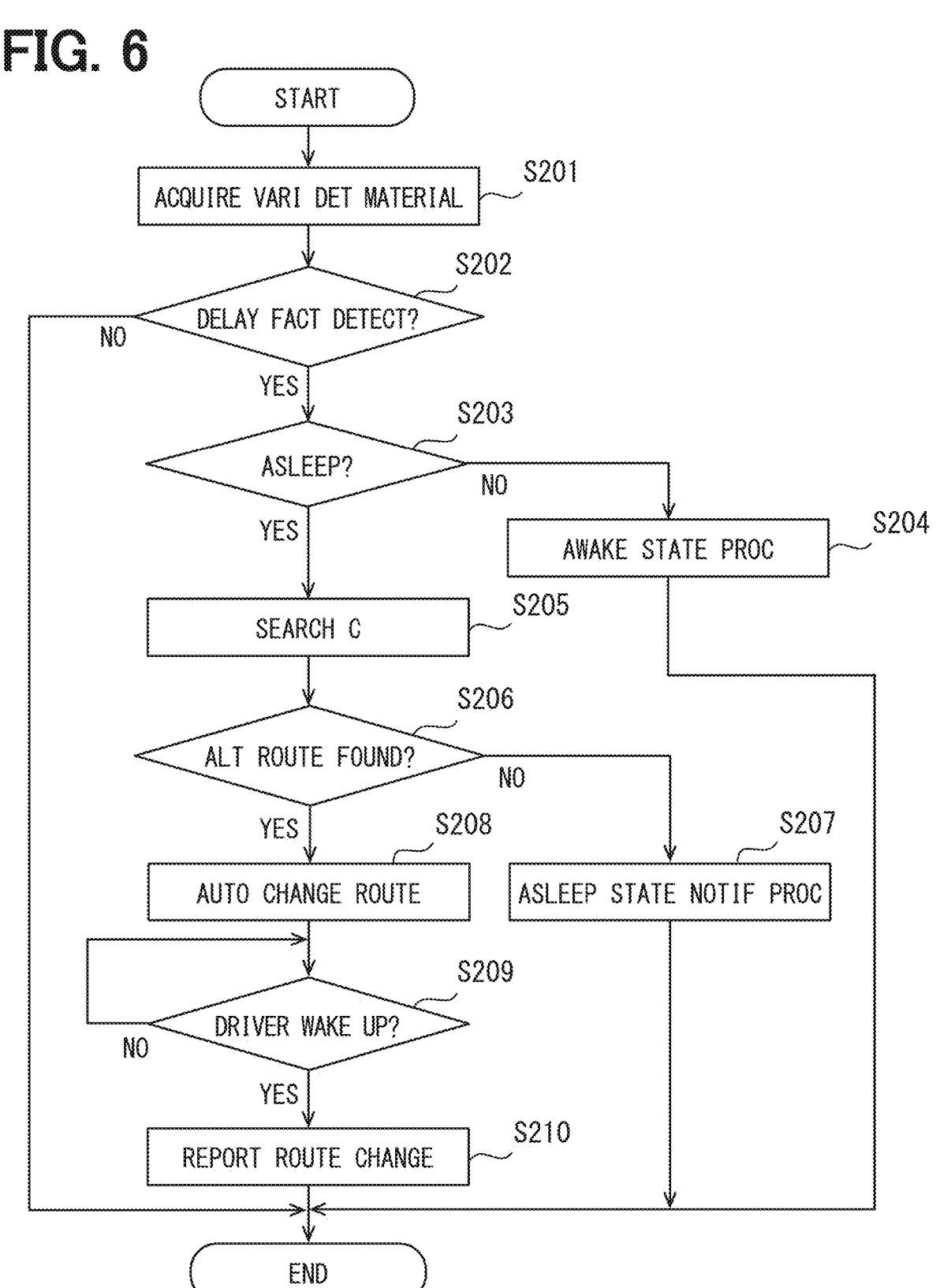
FIG. 6 is a flowchart showing an example of a delay factor response process.

Here, the delay factor response process during the autonomous driving, which is performed by the autonomous driving ECU 30, will be described with reference to the flowchart shown in FIG. 6. The delay factor response process shown in FIG. 6 is started at a predetermined cycle (for example, every one minute or every five minutes) during the autonomous driving. The delay factor response process shown in FIG. 6 includes steps S201 to S210. The description of the processor 31 as the entity implementing the following steps can be appropriately read as the information acquisition unit F1, the environment recognition unit F2, the passenger state acquisition unit F3, the mode control unit F4, or the vehicle control unit F5.

First, step S201 is a step in which the information acquisition unit F1 acquires various pieces of information to be used in the subsequent processes. The information acquisition unit F1 acquires traffic information, weather information, behavior of periphery vehicles, behavior of the subject vehicle itself, driver's state information, and the like. The behavior of periphery vehicles refers to the status of hazard lights, brake lights, and turn signals, as well as vehicle speed. The behavior of the subject vehicle refers to the vehicle speed, the frequency of stopping and starting, and the like.

Step S202 is a step in which the delay factor detection unit F21 determines whether or not there is a delay factor such as the traffic congestion on the travel route of the subject vehicle based on the information acquired in step S201. The delay factor detection unit F21 determines whether or not there is the traffic congestion or a section where the speed limit is tightened on the travel route, based on traffic information distributed from a traffic information center. When a traffic congestion exists on the travel route, this situation includes a state before the subject vehicle is in a line of vehicles that make up the traffic congestion, as well as a state in which the subject vehicle is already caught in the traffic congestion. When the road is a road only for motor vehicles, the delay factor detection unit F21 may determine that a delay factor exists based on whether another vehicle ahead of the subject vehicle is stopped or whether the speed of the preceding vehicle or the subject vehicle itself is below the traffic congestion determination value. The result of the determination in step S202 is stored in the memory 32.

When the processor 31 determines in step S202 that a delay factor exists on the travel route, the processor 31 executes step S203. On the other hand, if it is determined that there is no delay factor on the travel route, this flow ends. The travel route assumed in this step is a route that has been approved by the driver. The travel route assumed in this step is, for example, the initial route. If a re-search of a route is performed and the route is changed based on an instruction from the driver after the initial route is set, the changed travel route corresponds to the travel route that is the target of this step. A route for which the driver's consent has been acquired, or actually, a route for which the driver has given a positive response to a proposal from the system, such as by pressing an OK button, corresponds to an approved route.

Step S203 is a step in which the passenger state acquisition unit F3 determines whether or not the driver is asleep based on the driver state information acquired in step S201. If it is determined in step S203 that the driver is awake, the processor 31 executes step S204. On the other hand, if it is determined that the driver is asleep, the processor 31 executes the process of step S205 and subsequent steps.

Step S204 is a step in which the vehicle control unit F5 performs the awake state process. The a wake state process is a process for notifying the driver of the presence of a delay factor, and the like on the prerequisite that the driver is awake. As the awake state process, the vehicle control unit F5 displays on the display 21 a delay factor notification image indicating the type of delay factor, the estimation arrival delay time, or the estimation delay time. The delay factor notification image may include a text message indicating the type of delay factor and the like. The delay factor notification image may be a pictogram, i.e., an icon image, that represents the delay factor.

The delay factor notification image may be displayed together with a predetermined notification sound. In the awake state process, the output of the voice message may be omitted in consideration of the possibility of annoying the passenger. Here, if the arrival delay time exceeds a predetermined allowable delay value (for example, 30 minutes), a voice message may be output.

The awake state process may include suggesting a change of the travel route (i.e., re-routing). The re-route proposal is a process that proposes adopting an alternative route that avoids part or all of the delay section. When a response signal indicating that the change in the travel plan route by the passenger is accepted is input from the input device 23 in response to the reroute proposal, the processor 31 continues the autonomous driving along the new route. The route candidates proposed in the awake state process may be the same as the alternative routes described above. In addition, the route candidates proposed in the awake state process may be routes with relaxed conditions regarding the AD continuable time. The processor 31 may propose a route with the greatest delay time reduction amount, regardless of the AD continuable time. The processor 31 may present, as options, alternative route candidates that prioritize the delay time reduction amount and alternative route candidates that prioritize the AD continuable time.

Step S205 is a step in which the alternative route acquisition unit F53 executes an alternative route search process. If an alternative route is found as a result of the alternative route search process ("YES" at step S206), the processor 31 executes sequence of step S208 and subsequent steps. On the other hand, if an alternative route is not found ("NO" at step S206), the processor 31 executes step S207.

Step S207 is a step in which the processor 31 performs a sleep notification process. The sleep notification process is a process for notifying information about delay factor on the prerequisite that the driver is asleep. If the driver is asleep, when outputting a loud notification sound and/or voice message, the driver may wake up, which may cause discomfort to the driver. For this reason, the sleep notification process notifies the information about the delay factor in a modest manner. The modest manner refers to a notification manner that aims not to wake up a sleeping passenger or not to annoy the passenger. The notification in a modest manner refers to a manner in which an image display is the main form of notification, no vibration is applied to the driver, and the output sound volume is set to a predetermined value or less. Setting the output sound volume to a predetermined value or less includes not outputting any sound. The notification in a modest manner may involve outputting a notification sound at a volume that is not too loud to annoy the passenger. The sound level not to annoy the passenger is defined as 55 dB or less, or the sound level by add 3 dB to the sound level in the compartment of the vehicle. A modest manner can also be referred to be an unobtrusive manner.

Furthermore, if the arrival delay time is equal to or greater than a predetermined value (for example, one hour) in step S207, the processor 31 may notify information about the delay factor in a conspicuous manner. The conspicuous manner is a manner intended to wake up the driver, and involves, in addition to displaying an image, outputting a voice message and/or sound with an effect at a volume equal to or higher than a predetermined value, or applying vibration. A notification in the conspicuous manner refers to a manner that is relatively more stimulating the passenger than a notification in a modest manner. The stimulation given to the occupants can be increased by increasing the sound volume output from the speaker 22, increasing the light intensity output from the display 21 or the interior lighting device, or increasing the vibration generated by the vibrator. The autonomous driving ECU 30 of this embodiment is configured to be able to control the notification mode in two stages, which are the conspicuous manner and the modest manner. Alternatively, the processor 31 may be configured to be able to select from three or more notification modes each having a different stimulation intensity according to the situation.

Here, even if the arrival delay time is equal to or greater than a predetermined value, the processor 31 may withhold notifying the delay factor in a conspicuous manner until the sleep continuation time becomes equal to or greater than the minimum sleep time. According to this control setting, the driver can secure a certain amount of sleep time, and the risk of the driver feeling annoyed when being woken up by a notification can be reduced.

Furthermore, if the arrival delay time is less than a predetermined notification threshold and the driver is asleep, the processor 31 may end this flow without providing any notification. The notification threshold is set to 15 minutes or 30 minutes. Additionally, if the processor 31 detects that a fellow passenger is present and the fellow passenger is awake, the processor 31 may notify information about the delay factor in a modest manner.

Step S208 is a step of changing the travel route to an alternative route without acquiring the driver's approval (i.e. automatically). Not acquiring the driver's approval corresponds to not requesting any operation/utterance for acquiring the driver's approval when changing the route. Specifically, step S208 may be a step of changing the route without displaying an image showing an overview/details of the alternative route and without making an inquiry as to whether it is okay to switch to the alternative route. The feature that the driving route has been switched to the alternative route may be notified in a modest manner. Alternatively, this notification may be omitted. Additionally, if the processor 31 detects that a fellow passenger is present and the fellow passenger is awake, the processor 31 may notify in a modest manner that the driving route has been changed due to a delay factor. This configuration can reduce the risk of the fellow passenger feeling anxiety when the system automatically changes a course and/or a behavior.

Step S209 is a step for determining whether the driver has woken up. The processor 31 detects that the driver has been awake based on, for example, whether the driver's eye opening degree is equal to or greater than a predetermined value, or whether the backrest angle of the driver's seat is restored to a predetermined value or greater. If it is confirmed that the driver is awake ("YES" at step S209), the processor 31 executes step S210. Step S209 can be interpreted as a step of waiting for the driver to wake up. Step S209 can be repeatedly executed at a predetermined time.

Step S210 is a step of notifying the awakened driver that the driving route has been changed. The notification of the route change is performed by displaying an image on the display 21 or by outputting an announcement sound/message. The notification content may preferably include the type of delay factor that existed on the travel route before the change, the length of the arrival delay time (i.e., the degree of influence of the delay factor), and the like.

<Effect of Above Configuration>

In the above configuration, if a delay factor is detected while the vehicle is in the autonomous driving mode and the driver is asleep, the vehicle route will be changed without the driver's approval if a suitable (i.e., reasonable) alternative route is available. According to this configuration, the driver's sleep is not disturbed, thereby improving the convenience of the autonomous driving. In other words, the risk of waking up a sleeping driver and causing annoyance to the driver can be reduced.

In addition, if the travel route is automatically changed, the driver will be notified as soon as the driver wakes up. By notifying the route change as soon as it is confirmed that the driver is awake, it is possible to increase the driver's satisfaction with the route change and the driver's trust in the system.

Furthermore, the alternative route employed in this embodiment is a route that the delay time reduction amount is equal to or larger than a predetermined value and also ensures the AD continuable time. In other words, it is a reasonable alternative route. Therefore, even if a route change is performed without the driver's approval, the risk of the driver feeling uncomfortable or distrustful can be reduced.

In addition, in this embodiment, if there is no suitable alternative route and the estimated arrival delay time is equal to or greater than a predetermined value, the presence of a delay factor is notified in a conspicuous manner promptly or when the minimum sleep time is achieved. This configuration reduces the risk of the arrival time being significantly delayed while the driver is asleep.

While one embodiment of the present disclosure has been described above, the present disclosure is not limited to the embodiment described above, and various modifications to be described below are included in the technical scope of the present disclosure and may be implemented by various modifications within a scope not departing from the spirit of the present disclosure, in addition to the modifications to be described below. Various supplements, modifications, and the like described below can be appropriately combined and implemented within a range in which no technical contradiction occurs. Components having the same or equivalent functions as those of the components described above are denoted by the same reference symbols, and description thereof may be omitted. When only a part of the configuration is mentioned, the description in the above embodiment can be applied to the remaining parts.

<Another Example of Delay Factor Response Process During Driver Sleep>

Furthermore, the processor 31 may change the control policy depending on the type of delay factor. Changing the control policy corresponds to changing the control settings or control conditions for performing the autonomous driving. When the detected delay factor is the traffic congestion, the processor 31 may relax the conditions for adopting an alternative route so as to more proactively perform route changes compared to a case where the delay factor is the tightening of the speed limit.

More specifically, when the delay factor is the traffic congestion, the processor 31 may set the shortening threshold to a value that is a predetermined amount smaller than when the delay factor is the tightening of the speed limit. The setting of smaller shortening threshold and smaller threshold such as the AD continuation required time corresponds to an example of relaxing the conditions for adopting an alternative route. In the present embodiments, the conditions for adopting an alternative route that are applied when the usual traffic congestion is detected while the driver is asleep are referred to as normal conditions, and adoption conditions that are more relaxed than the normal conditions are referred to as relaxed conditions. The relaxed conditions may be adoption conditions in which the shortening threshold is set to 0 or half of the normal conditions. The AD continuation required time under the relaxed condition may be the same as that under the normal condition. According to this condition setting, even when relaxed conditions are applied, the driver's desired sleep time can be ensured.

Furthermore, when the detected delay factor is the tightening of the speed limit, the processor 31 may set stricter conditions for adopting an alternative route so as to maintain the current route as much as possible. When the detected delay factor is the tightening of the speed limit, the processor 31 may set the shortening threshold to a predetermined value larger than the set value for the normal condition.

Furthermore, the processor 31 may change the conditions for adopting an alternative route depending on whether the delay factor is a blockage of all lanes or a blockage of only some of the lanes. An event that blocks all lanes is a road closure, such as a large-scale accident or construction that blocks all lanes. An event in which only some lanes are blocked is a lane restriction, and is a relatively small-scale accident/construction. Falling objects may also correspond to the delay factor by blocking only some lanes. When the delay factor is the blocking of all lanes, the processor 31 may relax the conditions for adopting an alternative route so as to more proactively perform route changes than when the delay factor is the blocking of only some lanes. On the other hand, if the delay factor is the blocking of only some of the lanes, in other words, if there are still lanes that vehicles are capable of passing through, the processor 31 may apply the normal conditions as the conditions for adopting the alternative route. According to this configuration, when an event equivalent to a road closure occurs, an alternative route is more likely to be adopted, and as a result, the arrival delay time may be reduced. In addition, if an event equivalent to lane regulation occurs, the current route is more likely to be maintained, reducing the risk of the driver making an undesired route change.

In addition, if the detected delay factor is one that blocks only some of the lanes, the processor 31 may generate a control plan to give priority to traveling along the to-be-closed lane over the remaining lanes up to a predetermined distance before the delay section. The to-be-closed lane is a lane that will be set as a closed lane due to traffic regulations. The to-be-closed lane can also be referred to a restricted lane. The remaining lane refers to the lane that is parallel to the to-be-closed lane and is open to traffic. Before the delay section, other vehicles traveling in the to-be-closed lane will move one by one to the remaining lanes, so the cruising speed will tend to be faster in the to-be-closed lane than in the remaining lanes.

This control policy is generated based on the above-described tendency, and if the detected delay factor is one that blocks only some of the lanes, it is expected for the vehicle to acquire the reduction effect on the arrival delay time by performing the travel control to travel positively on the to-be-closed lane until a certain distance before the delay section. Here, changing the lane in which the vehicle is to travel in this manner can also be included in the feature of changing the travel route. Here, in another aspect, the processor 31 may generate a control plan in which, when the detected delay factor is the blocking of only some of the lanes, the vehicle is preferentially traveling on the remaining lanes. According to this configuration, it is possible to avoid performing a lane change immediately before a delay section.

During the usual traffic congestion, all lanes may be roughly equally congested. The processor 31 may change the control policy for the autonomous driving and/or the conditions for adopting an alternative route depending on whether the delay factor is the usual congestion or the lane restriction congestion. The processor 31 may change the travel route when the delay factor is the usual traffic congestion, whereas the processor 31 may maintain the current route when the delay factor is the lane restriction congestion.

Here, if the detected delay factor is an accident, the traffic congestion length may become longer rapidly compared to the usual traffic congestion. In other words, when an accident occurs, the arrival delay time may increase from moment to moment. For this reason, when the processor 31 detects an accident on the travel route as a delay factor, the processor 31 may automatically change to an alternative route or suggest a reroute, regardless of the delay time reduction amount and/or the arrival delay time estimated at a time point when the delay factor is detected.

Figure 7:
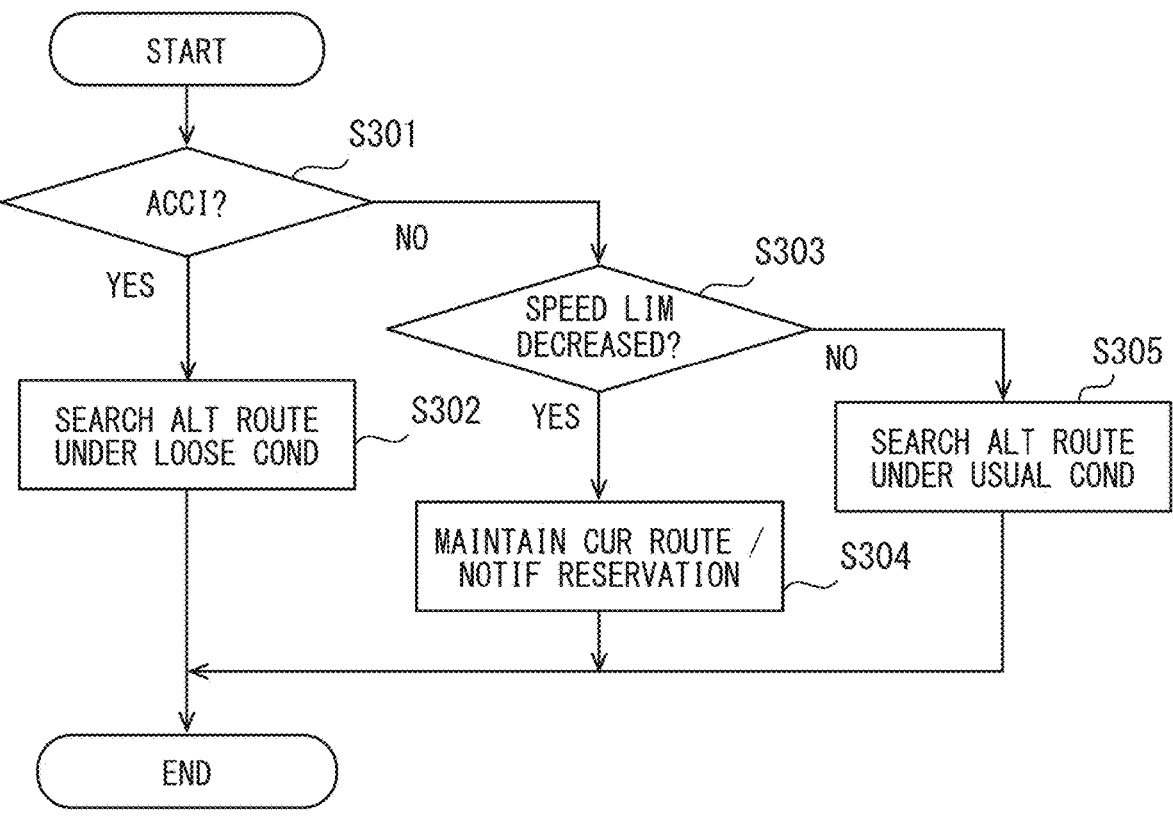
FIG. 7 is a diagram for explaining a modification example of the delay factor response process.

FIG. 7 is a flow chart showing an example of the operation of the processor 31 corresponding to the above-described technical feature. The flowchart shown in FIG. 7 is a modification example of the delay factor response process when the driver is asleep, and can be performed as a sequence of step S205 and subsequent steps when, for example, a positive determination is made in step S203. Steps S301 to S305 in the flowchart shown in FIG. 7 are performed by the processor 31 in sequence according to the directions of the arrows in the drawing.

Step S301 is a step for determining whether the detected delay factor is an accident and/or a traffic congestion caused by an accident. If the detected delay factor is an accident and/or a traffic congestion caused by an accident ("YES" at step S301), an alternative route is searched for under relaxed conditions (at step S302). According to this configuration, an alternative route is proactively adopted. If no alternative route is found in step S302, the process may be the same as that in step S207.

On the other hand, if the detected delay factor is not the accident and/or the traffic congestion caused by an accident ("NO" at step S301), the processor 31 performs step S303. Step S303 is a step for determining whether the detected delay factor is the tightening of the speed limit. If the detected delay factor is the tightening of the speed limit ("YES" at step S303), it is decided to maintain the current route and a notification reservation is made (at step S304).

According to a configuration in which the current route is maintained when the delay factor detected while the driver is asleep is a tightening of the speed limit, the frequency of lane changes and the like can be reduced. The notification reservation indicates scheduling a notice of the presence of a delay factor in a conspicuous manner at the timing when the sleep continuation time of the driver becomes equal to or greater than the minimum sleep time. The tightening of the speed limit may suggest that there is an environmental factor, such as rain and fog, that can destabilize the continuity of the autonomous driving. According to a configuration in which the system wakes up the driver when the seep continuation time reaches the minimum sleep time, the possibility that the driver will still be asleep when the system reaches a limit and it becomes necessary to transfer the driving authority to the driver can be reduced. As a result, even if it becomes necessary to transfer the driving authority to a driver, the driving authority can be smoothly taken over to the driver. Here, step S304 may be a step of performing the alternative route search process under a stricter condition in which the shortening threshold is set to a predetermined value greater than the normal condition.

On the other hand, if the detected delay factor is not a tightening of the speed limit ("NO" at in step S303), the processor 31 performs step S305. Step S305 is a process performed when the detected delay factor is the usual congestion or the lane restriction congestion. In step S305, the processor 31 performs an alternative route search process under the normal condition.

As described above, according to a configuration in which different control policies are applied depending on the type of detected delay factor, it is possible to adopt a more reasonable travel route for the driver. As a result, convenience for the driver can be improved.

<Control Policy when Alternative Routes Cannot be Acquired>

Figure 8:
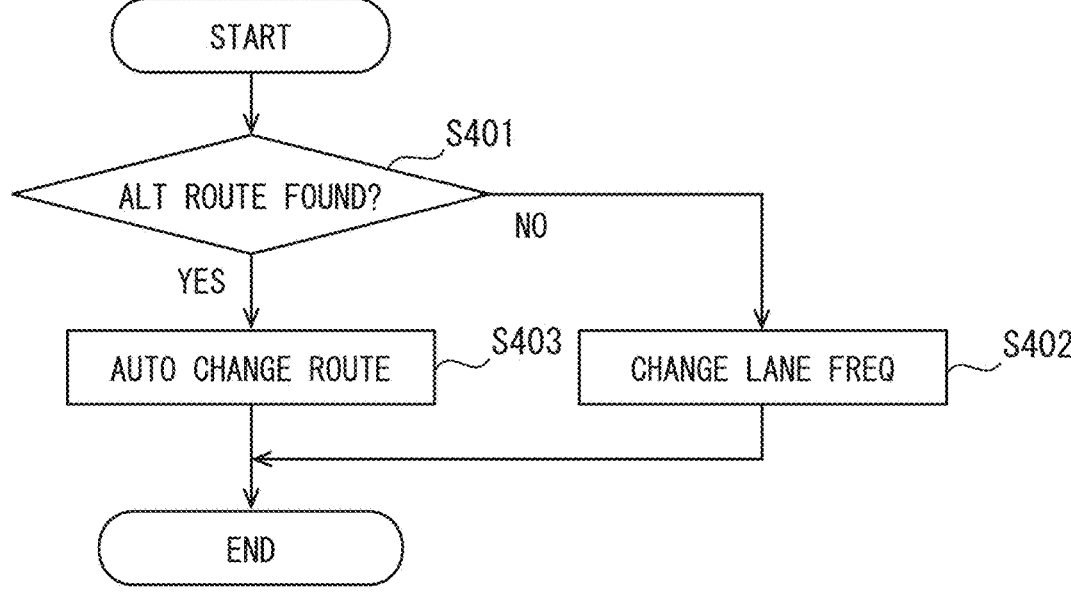
FIG. 8 is a diagram for explaining a modification example of the delay factor response process.

If the processor 31 as the vehicle control unit F5 is unable to acquire an alternative route ("NO" at step S206), the processor 31 may change the control condition for performing the autonomous driving in addition to/instead of the sleep notification process. Changing the control condition for the autonomous driving refers to changing at least some of the control condition, such as the distance between vehicles as a control target, the condition for automatic lane change, the upper limit of allowable acceleration/deceleration, and the upper limit of allowable yaw rate, from the basic settings. The basic setting value refers to the setting value that is applied when performing a usual autonomous driving, such as when an alternative route is found or when there are no delay factors. The basic setting values can also be understood as setting values that are applied when the autonomous driving ECU 30 is activated. As shown in FIG. 8, if an alternative route is not found while the driver is asleep ("NO" at step S401), the processor 31 may relax the condition for lane change so as to proactively change lanes (at step S402). The items constituting the condition for performing a lane change may include the subject vehicle speed and the waiting time. The basic setting value for the subject vehicle speed refers to the lower limit of the vehicle speed at which the lane change is permitted. If the basic setting value for the subject vehicle speed for the lane change is 80 km/h, the setting value is changed to a value that can be performed the lane change even in a traffic congestion, such as 0 km/h or 10 km/h. This configuration corresponds to changing the lower limit of the vehicle speed at which a lane change is performed from a first speed to a second speed that is lower than the first speed.

Furthermore, whether or not a lane change can be made depends on the traffic situation in the lane to which the vehicle is moving. The waiting time for a lane change refers to the time from when the turn signal starts to light up until the lane change is cancelled, i.e., the timeout setting value. If the waiting time of the basic setting for a lane change is 15 seconds, the waiting time may be increased to, for example, 60 seconds. This configuration corresponds to changing the waiting time for a lane change from a first time to a second time that is longer than the first time. According to the above configuration, it may be possible to move to a lane where traffic is moving relatively faster during a traffic congestion. In addition, if the processor 31 cannot acquire an alternative route and the detected delay factor is the lane restriction and/or the lane restriction congestion, the processor 31 may generate and perform a control plan to travel through the to-be-closed lane. Here, if the processor 31 cannot acquire an alternative route and the detected delay factor is the lane restriction and/or the lane restriction congestion, the processor 31 may generate and perform a control plan to prioritize driving in the remaining lanes. In addition, if the processor 31 can acquire a suitable alternative route while the driver is asleep ("YES" at step S401), the processor 31 automatically changes the travel route to the alternative route (at step S403).

<Control Change Depending on Whether or not there is a Fellow Passenger>

Figure 9:
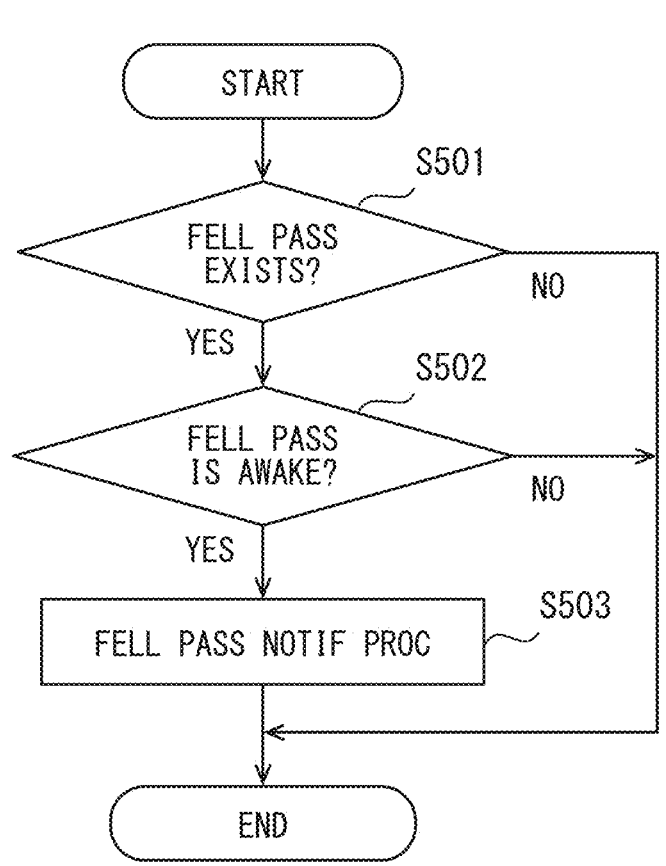
FIG. 9 is a diagram for explaining a modification example of the delay factor response process.

The processor 31 may change its response to the traffic congestion depending not only on whether the driver is awake, but also on whether the fellow passenger is asleep or awake. When a delay factor is detected while the driver is asleep and the fellow passenger is awake, the processor 31 may notify information about the delay factor as shown in FIG. 9. Step S501 shown in FIG. 9 is a step in which the processor 31 determines, based on an input signal from the passenger state sensor 16, whether or not a fellow passenger is present in the vehicle. Step S502 is a step for determining whether or not the fellow passenger is asleep based on an input signal from the passenger state sensor 16 if it is determined in step S501 that a fellow passenger is present in the vehicle. Step S503 is a step for notifying the fellow passenger of information regarding the delay factor when the fellow passenger is awake. Notification to the fellow passenger may be performed in a modest manner. Furthermore, the notification to the fellow passenger is performed using a display that is visible to the fellow passenger who is the target of the notification, such as a center display or a rear seat display.

Here, when the processor 31 changes the travel route or the control policy in response to detecting a delay factor without acquiring the driver's approval (i.e. automatically), if there is an awake fellow passenger, the processor 31 notifies the fellow passenger of this change in a modest manner. As described above, this configuration can reduce the risk of the fellow passenger feeling anxiety when the system automatically changes a course and/or a behavior.

Furthermore, when a delay factor is detected while the driver is asleep and the fellow passenger is awake, the processor 31 may request the fellow passenger to select a response policy for the delay factor. The options of the response policy for the delay factor include waking up the driver, switching to an alternative route without waking up the driver, and maintaining to travel the current route without waking up the driver. If the current route is to be maintained, the fellow passenger may be allowed to select whether or not to relax the condition for performing a lane change. In this way, when a delay factor is detected while the driver is asleep and the fellow passenger is awake, the processor 31 may ask the fellow passenger to determine whether or not to wake up the driver.

<Control Policy when Early Arrival is Estimated>

Figure 10:
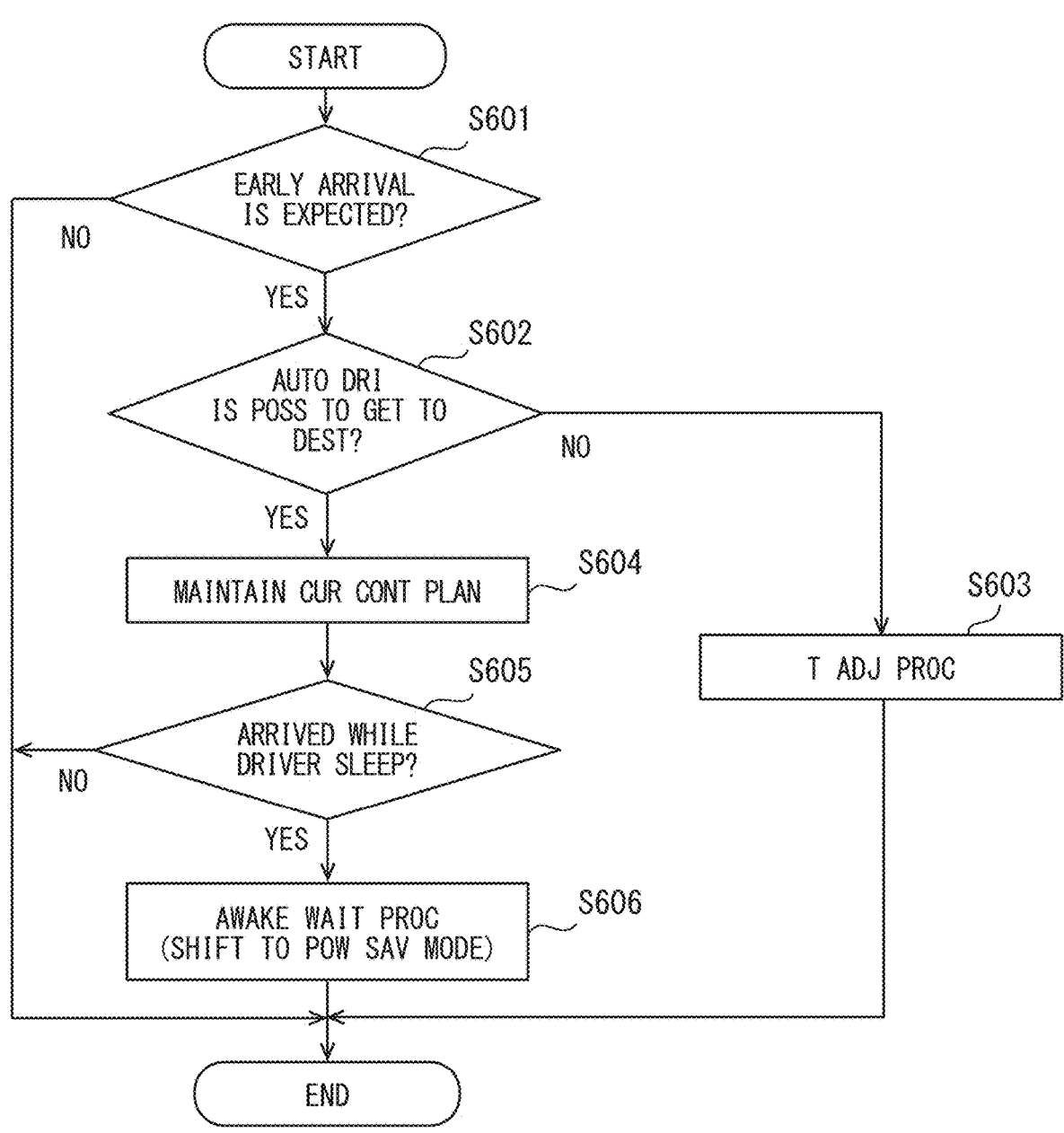
FIG. 10 is a diagram for explaining the operation of the processor when early arrival is expected.

If the driver is asleep and an early arrival at the destination is estimated, the processor 31 may automatically modify the travel plan so that the driver is able to sleep for at least the minimum sleep time. In the present embodiments, the early arrival refers to arriving at a destination a predetermined time or more earlier than the estimation arrival time before sleep. For example, if the driver is asleep and a delay factor such as the traffic congestion detected at the time of departure is resolved so that the early arrival of 30 minutes or more earlier than the estimation arrival time ("YES" at step S601 in FIG. 10), the processor 31 determines whether the vehicle can be driven autonomously to the destination (at step S602). If the vehicle cannot be driven autonomously to the destination ("NO" at step S602), in other words, if the ODD exit point is located before the destination, the processor 31 performs a time adjustment process (at step S603).

The time adjustment process refers to a process of changing the control plan so that the arrival time is closer to the estimation arrival time before sleep. As the time adjustment process, it is possible to adopt a method such as reducing the vehicle speed, stopping at a service area or the like, or changing the route. The reducing of the vehicle speed refers to the autonomous driving while reducing the target speed by a predetermined amount and/or a predetermined ratio from the original setting value. The original setting value refers to the target speed during the autonomous driving set by the driver, or the target speed preliminarily set in the system, or the maximum speed set for each road segment. The stopping at a service area, and the like refers to temporarily stopping in the parking lot of a service area and/or a parking area located along the autonomous driving section.

The time adjustment process may be performed on the condition that the driver is asleep. Furthermore, if it is estimated that the seep continuation time of the driver will be equal to or longer than the minimum sleep time before the vehicle arrives at the ODD exit point, the time adjustment process may be omitted. As a time adjustment process, the processor 31 first adopts the reducing of the vehicle speed, and if the reducing of the vehicle speed is insufficient for time adjustment, adopts temporary stopping at a service area or the like. Since it is necessary to avoid disrupting the flow of traffic, there may be a lower limit on the vehicle speed when there is no traffic congestion. The route change can be set as an option when it is difficult to adjust the arrival time by reducing the vehicle speed or to stop temporarily at a service area, and the like. The time adjustment process is an optional procedure and may be omitted.

If the vehicle is to travel autonomously to the destination ("YES" at step S602), the processor 31 maintains the control plan that was set before the early arrival was estimated (at step S604) and directs the vehicle to the destination. If the driver is still asleep when the vehicle arrives at the destination ("YES" at step S605), the wake-up waiting process is performed (at step S606).

The wake-up waiting process refers to a process of parking the vehicle in a parking space provided at the destination and waiting until the driver wakes up, until the current time reaches the estimation arrival time before sleep, or until the measured seep continuation time reaches the minimum sleep time. If no available parking space is found at the destination, the processor 31 may search for the nearest parking space, including a roadside where the parking is available, and wait for the driver to wake up in that parking space. The determination of whether or not a parking space is available and the process of searching for a parking space may be performed in cooperation with an external server, or may be performed by the autonomous driving system Sys itself using the periphery monitoring sensor 11.

After stopping the vehicle at the destination or in a parking space nearby the destination, the autonomous driving system Sys shifts to a power saving mode. The power saving mode is a mode in which functions related to the vehicle compartment comfort, such as air conditioning, are maintained, but functions such as the periphery monitoring sensor 11 are stopped. By stopping the periphery monitoring sensor 11 while waiting for the driver to wake up, it is expected that the power consumption during standby can be reduced. In addition, the processor 31 may notify the driver of the time in a conspicuous manner when the measured seep continuation time reaches the minimum sleep time or when the driver is still asleep when the estimation arrival time before sleep is reached. That is, the processor 31 may perform the control to wake up the driver.

<Modifications of System Configuration>

Figure 11:
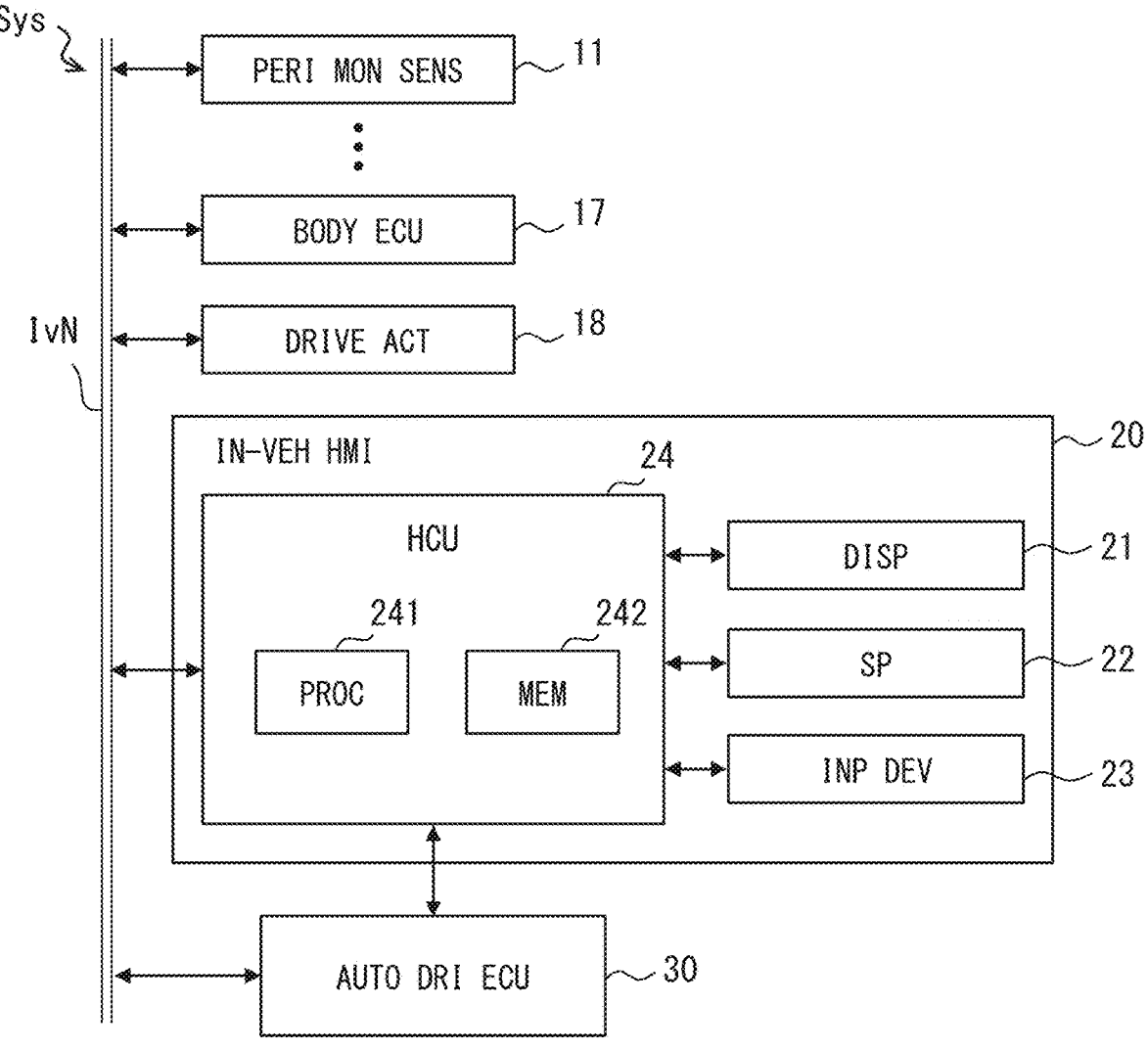
FIG. 11 is a block diagram showing another configuration example of the autonomous driving system.

The autonomous driving system Sys may include an HCU 24 that performs the integrated control of notification devices such as a display 21 as shown in FIG. 11. In FIG. 11, some of the configurations shown in FIG. 1 and FIG. 2 are omitted. The HCU 24 is realized using a processor 241 and a memory 242. The function relating to the notification control for the passenger may be provided by the HCU 24. The HCU 24 performs various notifications based on instructions and/or requests from the autonomous driving ECU 30.

(Note)

The various flowcharts shown in the present disclosure are all examples, and the number of processes constituting the flowcharts and the execution order of the processes can be changed as appropriate. Further, the device, the system and the method therefor which have been described in the present disclosure may be also realized by a dedicated computer which constitutes a processor programmed to execute one or more functions concretized by computer programs. The device and the method described in the present disclosure may be also implemented by a dedicated hardware logic circuit. The device, the system, and the method thereof described in the present disclosure may be implemented by one or more dedicated computers configured by a combination of a processor that executes a computer program and one or more hardware logic circuitries. For example, some or all of the functions of the processor 31 may be implemented as hardware. A configuration in which certain function is implemented by hardware logic circuitry includes a configuration in which the function is implemented using one or more ICs or the like. As the processor (arithmetic core), a CPU, an MPU, a GPU, a DFP (Data Flow Processor), or the like can be adopted. Some or all of the functions of the processor 31 may be implemented by combining multiple types of arithmetic processing devices. Some or all of the functions of the processor 31 may be implemented using a system-on chip (SoC), an FPGA, an ASIC, or the like. FPGA is an abbreviation for Field-Programmable Gate Array. ASIC is an abbreviation for Application Specific Integrated Circuit. The similar feature is applied to the processor 241.

The computer program described above may be stored in a computer-readable non-transitory tangible storage medium as instructions to be executed by a computer. As a storage medium for storing the computer program, a hard disk drive (HDD), a solid state drive (SSD), a flash memory, or the like can be adopted. The scope of the present disclosure also includes programs for causing a computer to function as the autonomous driving ECU 30 and/or the HCU 24, non-transitory tangible storage mediums such as semiconductor memories which store these programs, and other aspects.

In the present disclosure, the term "processor" may refer to a single hardware processor or several hardware processors that are configured to execute computer program code (i.e., one or more instructions of a program). In other words, a processor may be one or more programmable hardware devices. For instance, a processor may be a general-purpose or embedded processor and include, but not necessarily limited to, CPU (a Central Processing Circuit), a microprocessor, a microcontroller, and PLD (a Programmable Logic Device) such as FPGA (a Field Programmable Gate Array).

The term "memory" in the present disclosure may refer to a single or several hardware memory configured to store computer program code (i.e., one or more instructions of a program) and/or data accessible by a processor. A memory may be implemented using any suitable memory technology, such as static random-access memory (SRAM), synchronous dynamic RAM (SDRAM), nonvolatile/Flash-type memory, or any other type of memory. Computer program code may be stored on the memory and, when executed by a processor, cause the processor to perform the above-described various functions.

In the present disclosure, the term "circuit" may refer to a single hardware logical circuit or several hardware logical circuits (in other words, "circuitry") that are configured to perform one or more functions. In other words (and in contrast to the term "processor"), the term "circuit" refers to one or more non-programmable circuits. For instance, a circuit may be IC (an Integrated Circuit) such as ASIC (an application-specific integrated circuit) and any other types of non-programmable circuits.

In the present disclosure, the phrase "at least one of (i) a circuit and (ii) a processor" should be understood as dis-junctive (logical disjunction) where the circuit and the processor can be optional and not be construed to mean "at least one of a circuit and at least one of a processor". Therefore, in the present disclosure, the phrase "at least one of a circuit and a processor is configured to cause an autonomous driving device to perform functions" should be understood that (i) only the circuit can cause an autonomous driving device to perform all the functions, (ii) only the processor can cause an autonomous driving device to per-form all the functions, or (iii) the circuit can cause an autonomous driving device to perform at least one of the functions and the processor can cause an autonomous driv-ing device to perform the remaining functions. For instance, in the case of the above-described (iii), function A and B among the functions A to C may be implemented by a circuit, while the remaining function C may be implemented by a processor.

It is noted that a flowchart or the processing of the flowchart in the present application includes sections (also referred to as steps), each of which is represented, for instance, as S101. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and con-structions. The present disclosure is intended to cover vari-ous modification and equivalent arrangements. In addition, while the various combinations and configurations, other combinations and configurations, including more, less or only a single element, are also within the spirit and scope of the present disclosure.

What is claimed is:

1. An autonomous driving device that performs an autonomous driving operation at an automation level that allows a driver seat passenger, who is a person seated in a driver seat, to sleep, the autonomous driving device com-prising:
   a vehicle control unit that performs the autonomous driving operation along an approved route that is a route approved by the driver seat passenger;
   a delay factor detection unit that detects a predetermined delay factor existing on the approved route based on traffic information or weather information received from an external device; and
   a passenger state acquisition unit that acquires whether the driver seat passenger is asleep based on an input signal from a passenger state sensor for sensing a state of the driver seat passenger, wherein:

the vehicle control unit searches for an alternative route that reduces a delay time using map data when detect-ing the delay factor; and
the vehicle control unit is configured to change a travel plan route to the alternative route without acquiring approval from the driver seat passenger when the alternative route is acquired while the driver seat pas-senger is asleep.

2. The autonomous driving device according to claim 1, wherein:
   the vehicle control unit is configured to search for a route as the alternative route that reduces the delay time and allows the autonomous driving operation to be contin-ued for a required time or more.

3. The autonomous driving device according to claim 2, wherein:
   the delay factor detection unit detects a traffic congestion section as the delay factor; and
   the vehicle control unit is configured to search for a route as the alternative route that reduces the delay time, allows the autonomous driving operation to be contin-ued for a required time or more, and provides to take a detour to avoid at least a part of the traffic congestion section.

4. The autonomous driving device according to claim 2, wherein:
   the delay factor detection unit detects, as the delay factor, a speed limit tightening section in which a maximum speed is temporarily reduced due to weather; and
   the vehicle control unit is configured to search for a route as the alternative route that allows the autonomous driving operation to be continued for a required time or more, and provides to take a detour to avoid at least a part of the speed limit tightening section.

5. The autonomous driving device according to claim 1, wherein:
   the delay factor detection unit detects a plurality of types of events as the delay factor; and
   the vehicle control unit is configured to perform different controls depending on a detected type of the delay factor.

6. The autonomous driving device according to claim 1, wherein:
   the delay factor detection unit distinguishes and detects a lane restriction and a road closure as the delay factor; and
   the vehicle control unit is configured to apply different control policies when the lane restriction is detected and when the road closure is detected.

7. The autonomous driving device according to claim 1, wherein:
   the vehicle control unit searches for a route as the alter-native route that reduces a delay of an estimation arrival time and allows the autonomous driving opera-tion to be continued for a required time or more; and
   the vehicle control unit is configured to relax a condition for automatically performing a lane change when the alternative route is not acquired.

8. The autonomous driving device according to claim 1, wherein:
   the delay factor detection unit detects a lane restriction traffic congestion caused by a lane restriction as the delay factor to distinguish the lane restriction traffic congestion from other events;
   the vehicle control unit searches for a route as the alter-native route that reduces the delay time and allows the autonomous driving operation to be continued for a required time or more; and the vehicle control unit is configured to travel in a lane to be closed by the lane restriction before a traffic congestion section when the alternative route is not acquired, and the delay factor detected is the lane restriction traffic congestion.

9. The autonomous driving device according to claim 1, wherein:

the passenger state acquisition unit further determines whether a fellow passenger is awake based on the input signal from the passenger state sensor; and the vehicle control unit is configured to display information regarding the delay factor on a display disposed in a position visible to the fellow passenger when the driver seat passenger is asleep and the fellow passenger is awake.

10. The autonomous driving device according to claim 9, wherein:

the vehicle control unit is configured to perform a process for inquiring the fellow passenger about a response policy for the delay factor when the delay factor is detected in a situation where the driver seat passenger is asleep and the fellow passenger is awake.

11. The autonomous driving device according to claim 1, wherein:

the passenger state acquisition unit acquires a sleep continuation time that is a time during which the driver seat passenger is asleep;

the vehicle control unit acquires a minimum sleep time, which is a sleep time that the driver seat passenger requires, based on a signal from an input device or pre-registered data; and the vehicle control unit is configured not to perform a notification regarding the delay factor until the sleep continuation time reaches the minimum sleep time when the alternative route is not acquired.

12. The autonomous driving device according to claim 1, wherein:

the vehicle control unit is configured to:

periodically calculate an estimated time of arrival at a destination;

determine whether a vehicle can arrive earlier by predetermined time than estimation arrival time before sleep by comparing the estimation arrival time before sleep, which is estimated before the driver seat passenger falls asleep, with the estimation arrival time estimated while the driver seat passenger is asleep; and reduce a target speed of the autonomous driving operation by a predetermined amount when determining that the vehicle can arrive earlier by the predetermined time than the estimation arrival time before sleep.

13. The autonomous driving device according to claim 1, wherein:

the vehicle control unit is configured to: withhold a notification of arrival at a destination until estimation arrival time before sleep, which is the estimation arrival time estimated before the driver seat passenger falls asleep, when the driver seat passenger is asleep and current time has not yet reached the estimation arrival time before sleep at time of arrival at the destination.

14. The autonomous driving device according to claim 13, wherein:

the autonomous driving device operates in a power saving mode with a periphery monitoring sensor stopped while a vehicle has arrived at the destination and is stopped to wait for the driver seat passenger to wake up.

15. The autonomous driving device according to claim 1, further comprising:

at least one of (i) a circuit and (ii) a processor having a memory storing computer program code, wherein the at least one of the circuit and the processor having the memory is configured to cause the autonomous driving device to provide at least one of: the vehicle control unit; the delay factor detection unit; and the passenger state acquisition unit.

16. A vehicle control method performed by at least one processor for a vehicle, comprising:

performing an autonomous driving operation at an automation level that allows a driver seat passenger, who is a person seated in a driver seat, to sleep based on an instruction from the driver seat passenger;

acquiring an approved route that is a route that has been approved by the driver seat passenger;

detecting a predetermined delay factor existing on the approved route based on traffic information or weather information received from an external device;

determining, based on an input signal from a passenger state sensor for sensing a state of the driver seat passenger, whether the driver seat passenger is asleep;

searching for an alternative route that reduces a delay time using map data when detecting the delay factor; and changing a travel plan route to the alternative route without acquiring approval from the driver seat passenger when the alternative route is acquired while the driver seat passenger is asleep.

17. An autonomous driving device that performs an autonomous driving operation at an automation level that allows a driver seat passenger, who is a person seated in a driver seat, to sleep, the autonomous driving device comprising:

at least one of (i) a circuit and (ii) a processor having a memory storing computer program code, wherein the at least one of the circuit and the processor having the memory is configured to cause the autonomous driving device to:

perform the autonomous driving operation along an approved route that is a route approved by the driver seat passenger;

detect a predetermined delay factor existing on the approved route based on traffic information or weather information received from an external device; and acquire whether the driver seat passenger is asleep based on an input signal from a passenger state sensor for sensing a state of the driver seat passenger;

search for an alternative route that reduces a delay time using map data when detecting the delay factor; and change a travel plan route to the alternative route without acquiring approval from the driver seat passenger when the alternative route is acquired while the driver seat passenger is asleep.

* * * * *